United States Patent [19]

Tagawa

[11] Patent Number: 5,732,398

[45] Date of Patent: Mar. 24, 1998

[54] SELF-SERVICE SYSTEM FOR SELLING TRAVEL-RELATED SERVICES OR PRODUCTS

[75] Inventor: Richard S. Tagawa, Honolulu, Hi.

[73] Assignee: Keyosk Corp., Honolulu, Hi.

[21] Appl. No.: 555,433

[22] Filed: Nov. 9, 1995

[51] Int. Cl.⁶ ..................... G06F 17/60
[52] U.S. Cl. ............. 705/5; 705/26; 705/27
[58] Field of Search ............... 235/375, 379, 235/380, 381; 395/201, 205, 206, 213, 216, 221, 222, 226, 227, 601, 602, 603, 604, 605, 610, 806, 807, 326, 352

[56] References Cited

U.S. PATENT DOCUMENTS

| | | | |
|---|---|---|---|
| Re. 32,115 | 4/1986 | Lockwood et al. | 235/381 |
| D. 269,822 | 7/1983 | Barthel | D99/28 |
| 4,179,723 | 12/1979 | Spencer | 361/687 |
| 4,359,631 | 11/1982 | Lockwood et al. | 235/381 |
| 4,449,186 | 5/1984 | Kelly et al. | 395/205 |
| 4,490,810 | 12/1984 | Hon | 463/43 |
| 4,818,854 | 4/1989 | Davies et al. | 235/381 |
| 4,922,439 | 5/1990 | Greenblatt | 395/206 |
| 5,235,509 | 8/1993 | Mueller et al. | 395/215 |
| 5,235,680 | 8/1993 | Bijnagte | 395/610 |
| 5,237,499 | 8/1993 | Garback | 395/205 |
| 5,239,480 | 8/1993 | Huegel | 395/205 |
| 5,274,758 | 12/1993 | Beitel et al. | 395/807 |
| 5,393,964 | 2/1995 | Hamilton et al. | 235/381 |
| 5,408,417 | 4/1995 | Wilder | 395/205 |
| 5,422,809 | 6/1995 | Griffin et al. | 395/205 |

OTHER PUBLICATIONS

"L–CATA: A Logic–Based Expert Travel System," S.Y. Yan et al., *Computer Science in Economics and Management*, vol. 4, No. 2, 1991, pp. 151–163.

"Through the Electronic Looking Glass into Living Pictures," John Free, *Popular Science*, pp. 68–70, Aug. 1981.

*Primary Examiner*—Gail O. Hayes
*Assistant Examiner*—Stephen R. Tkacs
*Attorney, Agent, or Firm*—Majestic, Parsons Siebert & Hsue

[57] ABSTRACT

In a self-service system of selling travel-related services or products by means of an interactive travel service system functioning like a travel agent, to simplify the search process by the system and the decision process by the user, the user is first queried as to travel knowledge, such as whether the user is a first-time visitor or is otherwise familiar with the travel destination, and as to personal attribute such as family orientation, age and preference for airlines, lodgings, car rental companies, price range and lifestyle. In accordance with the travel knowledge and attributes inputted electronically by the user, one or more recommendations or a whole listing will be presented for selection by the user. To simplify the process, the user is asked to input the relevant dates and the inventory database is searched so that only available choices will be presented. The system is particularly advantageous for self-service method of selling travel-related services or products such as local tour attractions, local bookings, car rental bookings, local or intrastate tour packages, airline tickets, out-of-state tour packages, cruises, optional tours or cruises, and other shopping options.

13 Claims, 26 Drawing Sheets

Microfiche Appendix Included
(2 Microfiche, 169 Pages)

Daily Planner/Calendar

These are your scheduled attractions.
Would you like another?

HELP

— 226

MAY

| SUN | MON | TUE | WED | THU | FRI | SAT |
|---|---|---|---|---|---|---|
|  |  |  | 24 | 25<br>ARIZONA MEMORIAL | 26 | 27<br>SUBMARINE RIDE<br><br>DON HO SHOW |
| 28 | 29<br>POLYNESIAN CULTURAL CENTER | 30 | 31 |  |  |  |

JUNE

|  |  |  |  | 1 | 2 | 3 |
|---|---|---|---|---|---|---|

ANOTHER ATTRACTION? — 270

YES

NO

SELF-SERVICE SYSTEM FOR SELLING TRAVEL-RELATED SERVICES OR PRODUCTS

MICROFICHE APPENDIX

Attached herewith as part of this application is a microfiche appendix entitled "Self-Serve Tours 1.0" dated Monday, Nov. 6, 1995, including 2 sheets and 169 frames. This microfiche appendix sets forth in detail how the flow charts of this application are implemented.

BACKGROUND OF THE INVENTION

This invention relates in general to systems for selling travel-related services or products and in particular to a self-service system of selling such services or products by means of an interactive travel service system.

The selling of travel-related services and products is a labor-intensive process. Competitive pressures have caused the automation of many service industries, including travel. For this reason, a number of automated travel-related self-service sales systems have been proposed. See, for example, U.S. Pat. No. 5,408,417 to Wilder; U.S. Pat. No. 5,393,964 to Hamilton et al.; U.S. Pat. No. 5,239,480 to Huego; U.S. Pat. No. RE. 32,115 to Lockwood et al.; and U.S. Pat. No. 5,422,809 to Griffin et al.

While the systems proposed in the patents referenced above mark advances over labor-intensive sales by human sales persons, they are not entirely satisfactory. In U.S. Pat. No. 5,422,809 to Griffin et al., for example, the system proposed appears to be primarily one that provides "information" but does not attempt to assist the traveler in making a selection, and deliver any travel documents. While this may be useful for some types of business marketing, it is not a practical system for selling leisure travel as explained below.

Leisure travel has exploded in recent years. With air travel being increasingly affordable, more and more people have taken on leisure travel. The needs of the leisure traveler are frequently quite different from those of the business traveler. While the business traveler may be quite familiar with the various destinations he or she plans to visit, the leisure traveler usually does not return to the same vacation destination time and time again but usually seeks out new travel destinations. Furthermore, the wide variety of touring activities and attractions at different destinations can be bewildering to a leisure traveler planning a trip. Planning a vacation is much more than perusing a Sears Department Store catalogue. There are a lot more variables involved.

In order for the travel industry to deliver travel-related services and products to the leisure traveler, one of the key links is the role of the travel agent. Because of the large number of variables and large selection of touring related services and products, the sheer amount of information facing a leisure traveler planning a trip can be overwhelming. The role of the travel agent is to match the particular financial situation, preferences and desires of a leisure traveler with the available services and products.

A major problem within the travel industry is the high cost of the present distribution system. A large portion of this cost is attributable to the sales process. It is very labor-intensive and time-consuming to qualify the customer, to present the information, to assist the customer in making a decision, closing the sale, accepting payment, delivering tickets, and documenting the sale. This function is presently being performed by travel agents, reservations agents employed by travel suppliers and agents at travel desks at tourist destination areas.

With increasing competition within the travel industry, it is therefore desirable to automate and use computerized systems to perform the sales functions. Travel agents should be employed to service travelers with complicated itineraries and special requests.

If all that an automated system does is to provide information, such information can easily overwhelm the user of the system. In the above-referenced patent to Griffin et al., for example, the approach is equivalent to having a customer going into a travel store with a large array of brochure racks. Even if the customer has taken the time to read the pertinent brochures, the typical customer will still have difficulty making a selection. In the end, the customer will probably call a travel agent to obtain an explanation of the different alternatives and seek recommendations.

Therefore, while Griffin et al.'s system may provide for a storage and retrieval system for travel-related information, querying the user to select a travel destination area, providing a telephone link to a reservations order taker, and accepting payment, it cannot take the place of a travel agent or a travel supplier's reservations agent. It is truly not a point of sale device for travel-related services or products because the process is not complete. The system proposed by Griffin et al. assumes that travelers will be able to plan their own trips without the aid of a travel professional. It supposes that by providing travel-related information, travelers will be able to do their own research and make their own decisions without outside help. It is therefore desirable to provide an improved self-service system for selling travel-related services and products that can largely duplicate the services of a travel agent or travel supplier's reservations agent.

SUMMARY OF THE INVENTION

This invention is based on the observation that the above-described difficulties of systems described above can be alleviated by providing a self-service system for selling travel-related services and products where the system can function like a travel agent. More specifically, the process of matching the financial situation and needs of the traveler with the available choices would be much simplified if the user of the self-service system is first qualified in a qualifying step. In this qualifying step, the self-service system would query the user to elicit information useful for the matching process. Such information may include travel knowledge and/or personal attributes in regard to the services or products. In this context, travel knowledge may include prior experience at the destinations of interest for repeat visitors as well as general familiarity with the destination based on secondhand knowledge. When serving such a knowledgeable visitor, the self-service system preferably functions differently compared to serving a user who is a first-time visitor and who is not familiar with the destinations. The personal attribute of the user would include any information which can affect the user's choice of one type of travel-related service or product over another, and may include age, lifestyle (for example, fun/action seeking, family, average or quiet lifestyle), income level, and other preferences as described in detail below. If the user is traveling with one or more companions, there may be group attributes as well. Thus single individuals in their twenties traveling together in a group would probably have interests that are vastly different from those of a middle-aged couple. During the qualifying step, the user may also be asked concerning any particular preference they have in terms of lodging, car rental companies, airline companies or other preferences. The data input by the user in response to such queries would then be used to narrow down the search process of the choices that match the user's needs.

Thus one aspect of the invention is directed towards a self-service method of selling travel-related services or products by means of an interactive electronic travel-related service system functioning like a travel agent. The method comprises the steps of initiating two-way communication between a user and the system, qualifying the user with respect to travel knowledge and/or attributes in regard to said services or products, providing to the user information and/or choice of said services or products in response to said travel knowledge and/or attributes, and closing a sale for the services or products selected by the user.

Another aspect of the invention is based on the recognition that inviting the user to enter dates for the travel-related services or products by means of a calendar is a particularly effective tool to assist the user in selecting the desired travel-related service or product. Thus another aspect of the invention is directed towards a self-service method of selling travel-related services or products by means of an interactive electronic travel service system functioning like a travel agent, comprising the steps of initiating two-way communication between a user and a system, displaying a calendar on the display screen for the user to input dates for said services or products, querying the user for input data concerning name or names for which the reservation of said services or products is to be made and closing a sale for the services or products selected by the user.

To the business traveler, the price of the travel-related service or product may not be the most important consideration compared to other factors such as schedules and convenience. To a leisure traveler, however, pricing information is usually critical for the choice of the service or product. Another aspect of the invention is based on a self-service method of selling travel-related services or products by means of an interactive electronic travel service system functioning like a travel agent. The method comprises the steps of initiating two-way communication between the user and the system, providing to the user information and/or choice of said services or products together with pricing information for said services or products prior to user's selection of services or products, accepting payment for the services or products selected by the user, and delivering a value voucher for the paid service or product to the user. In many self-service type systems for selling travel-related services or products, even though the system is used for supplying information and accepting payment, all the user is provided with is a confirmation number but no legal document of value that can be exchanged for a service or product. The above-described method not only accepts payment for the service or product but also delivers a value voucher for the paid service or product to the user. The user can then treat the value voucher in the same way that an airline ticket is treated. All the user has to do is to present the value voucher in order to obtain the service or product already paid for without having to produce personal identification.

In conventional self-service systems such as that of Griffin et al. described above, information on different services or products are presented without first checking to see whether these services or products are available on the desired dates. Consequently, the user may find out that the services or products desired are not available on the dates specified after spending much time sorting through the different services or products. This can be frustrating and time-consuming. Thus another aspect of the invention is based on the recognition that information and/or choice of only services or products available for a specified date or dates is provided to the user to simplify the search and decision process by the user. Hence another aspect of the invention is directed towards a self-service method of selling travel-related services or products by means of an interactive electronic travel service system functioning like a travel agent. The method comprises the steps of initiating two-way communication between a user and the system, querying the user for input data indicating travel-related services or products desired by the user, said data including information concerning date or dates for said services or products. The method further comprises receiving said input data and searching the inventory database for said desired services or products available on said date or dates and providing to the user information and/or choice of only services or products available for said date or dates.

Another aspect of the invention is its multi-lingual capability. Both audio and visual text may be presented to the user in English or in a foreign language.

Yet another aspect of the invention is directed towards a self-service method of selling air travel services by means of an interactive electronic travel service system functioning like a travel agent. The method comprises the steps of initiating two-way communication between a user and the system, querying the user for input data indicating desired origin and destination of trip and air transportation date(s), searching a database for available flight or flights that suit said input, and displaying information concerning said flight or flights. The method further comprises closing a sale, accepting payment for the flight or flights selected by the user and delivering a non-Airline-Reporting Corporation value voucher for the paid flight or flights to the user.

Another aspect of the invention is directed towards a self-service method of selling services or products related to local visitor attractions of a destination area by means of an interactive electronic travel service system functioning like a travel agent. The method comprises initiating two-way communication between a user and a system, querying the user as to whether the user has travel knowledge of said destination area, providing to the user who is a first-time visitor and who is not otherwise familiar with the destination area information concerning attractions usually preferred by first-time visitors. The method further comprises supplying choices of different local visitor attractions for selection to the user and closing a sale and confirming a reservation for the selected local visitor attraction or attractions made by the user.

One more aspect of the invention is directed towards a self-service method of selling lodging bookings for a destination area by means of an interactive electronic travel service system functioning like a travel agent. The method comprises initiating two-way communication between the user and the system, displaying a calendar on a display screen for the user to input dates for said bookings, supplying choices of different lodgings for selection to the user and closing a sale and confirming a reservation for the selected lodgings made by the user.

Yet one more aspect of the invention is directed towards a self-service method of selling car rental bookings by means of an interactive electronic travel service system functioning like a travel agent. The method comprises the steps of initiating two-way communication between a user and the system, querying the user to select a car pick-up location; displaying a calendar on a display screen for the user to input select dates for said bookings; querying the user to input pick-up and drop-off times and supplying a choice of a rental car institution for the user. The method further comprises querying the user as to different car types with pricing information available to the user from a selected or recommended rental car institution and closing a sale and confirming a reservation for the selected car rental booking made by the user.

Still another aspect of the invention is directed towards a self-service method of selling local and intrastate tours by means of an interactive electronic travel service system functioning like a travel agent, comprising the steps of initiating two-way communication between the user and the system, querying the user as to whether a one-day or multi-day tour is desired and providing to user air and ground transportation and/or lodging information concerning a tour selected by the user. The method further comprises supplying choices of different arrangements for the selected tour and closing a sale and confirming a reservation for the selected tour and arrangements made by the user.

Yet another aspect of the invention is directed towards a self-service method of selling airline travel services by means of an interactive electronic travel service system functioning like a travel agent, comprising the steps of initiating two-way communication between the user and the system, querying the user as to whether user has preference for an airline, displaying on the display screen all available airline carriers for selection by the user when the user indicates a preference and querying the user on flight segment data and whether a return flight is desired. The method further comprises querying the user on return flight segment data when user indicates that a return flight is desired, displaying the flight schedule on available flights with price information and closing a sale and confirming a reservation for the flight or flights selected by the user.

An additional aspect of the invention is directed towards a self-service method of selling tours outside of a local area by means of an interactive electronic travel service system functioning like a travel agent, comprising the steps of initiating two-way communication between a user and the system, asking the user to select a destination, requesting the user to select a pricing category from a number of pricing categories for tours to the destination selected by the user and displaying information on tour packages to said destination outside of a local area. The method further comprises displaying a calendar on the display screen for the user to select departure and return dates for said tour, querying the user for selection of lodging and/or car rental, and closing a sale and confirming a reservation for the tour with the lodging and/or car rental selected by the user.

Yet another aspect of the invention is directed towards a self-service method of selling cruises by means of an interactive electronic travel service system functioning like a travel agent, comprising the steps of initiating two-way communication between the user and the system, asking the user to select a cruise destination, a travel season, and length of cruise desired, qualifying the user for input data on cruise travel knowledge, price range, lifestyle and age information, and recommending at least one particular cruise in response to the input data.

The above-referenced self-service system can take many forms. In the preferred embodiment, the system comprises a plurality of regional reservation centers spread out geographically, each center having a geographical region and a database including information on travel services and products within its region, a plurality of sets of kiosks, each set of kiosks located within the geographical region of a regional reservation center defining the set of kiosks for such center. The system further comprises two-way communication links linking the kiosks of a set of kiosks to its corresponding regional reservation center and two-way communication links linking the regional reservation centers, so that information on travel services and products within a region is accessible to kiosks located in other regions.

One more aspect of the invention is directed towards a self-service method of selling airline tickets by means of an interactive electronic travel service system functioning like a travel agent, comprising the steps of initiating two-way communication between a user and the system, displaying available flights; executing reservations on flights selected by a user either through a computer reservation system (CRS) vendor or directly through an airline reservation center connected to the system, accepting payment for the flight or flights selected by the user and delivering at least one value voucher therefor to the user.

One more aspect of the invention is directed towards a self-service method of selling airline tickets by means of an interactive electronic travel service system functioning like a travel agent, comprising the steps of initiating two-way communication between a user and the system, querying the user to input data concerning a confirmation number for a flight reservation made by the user either through a travel agency, the Internet, computer reservation system (CRS) vendor or directly through an airline reservation center connected to the system, obtaining and displaying information on said flight reservation in response to said input data, accepting payment when required and delivering at least one value voucher therefor to the user.

Yet another aspect of the invention is directed towards a method for selling services and/or products by means of an interactive electronic system, comprising the steps of initiating two-way communication between a user and the system, displaying information on shopping options for said services and/or products, communicating selection made by the user to a vendor of said services and/or products and querying the user to input data concerning delivery options for said services and/or products. The method further comprises closing a sale of said services and/or products and confirming said sale on the display screen, accepting payment for said services and/or products and delivering a written instrument to the user concerning the paid services and/or products, and informing the vendor of the sale so that the services and/or products are delivered according to said input data.

Another aspect of the invention is the printing of documents in a foreign language. The text will always be printed in English but if the user selects the foreign language option, the printer will also print part of the document in the chosen foreign language so that both user and supplier may be able to understand the text. To enhance security and to facilitate the accounting function, an encrypted bar code will be printed on value vouchers.

Still another aspect of the invention is directed towards a method for selling tourist-related services and/or products on cruise ships by means of an interactive electronic system, comprising the steps of initiating two-way communication between a user and the system; providing to the user information and/or choice of said services or products at ports of call, said data including information concerning visitor attractions and tours during ports of call; receiving said input data and searching a database for said desired services or products available during said ports of call; and closing a sale for optional tours and other travel-related services and products.

BRIEF DESCRIPTION OF THE DRAWINGS

For simplicity in description, identical steps or components are identified by the same numerals in the different figures of this application.

DETAILED DESCRIPTION OF THE PREFERRED EMBODIMENT

Figure 1:
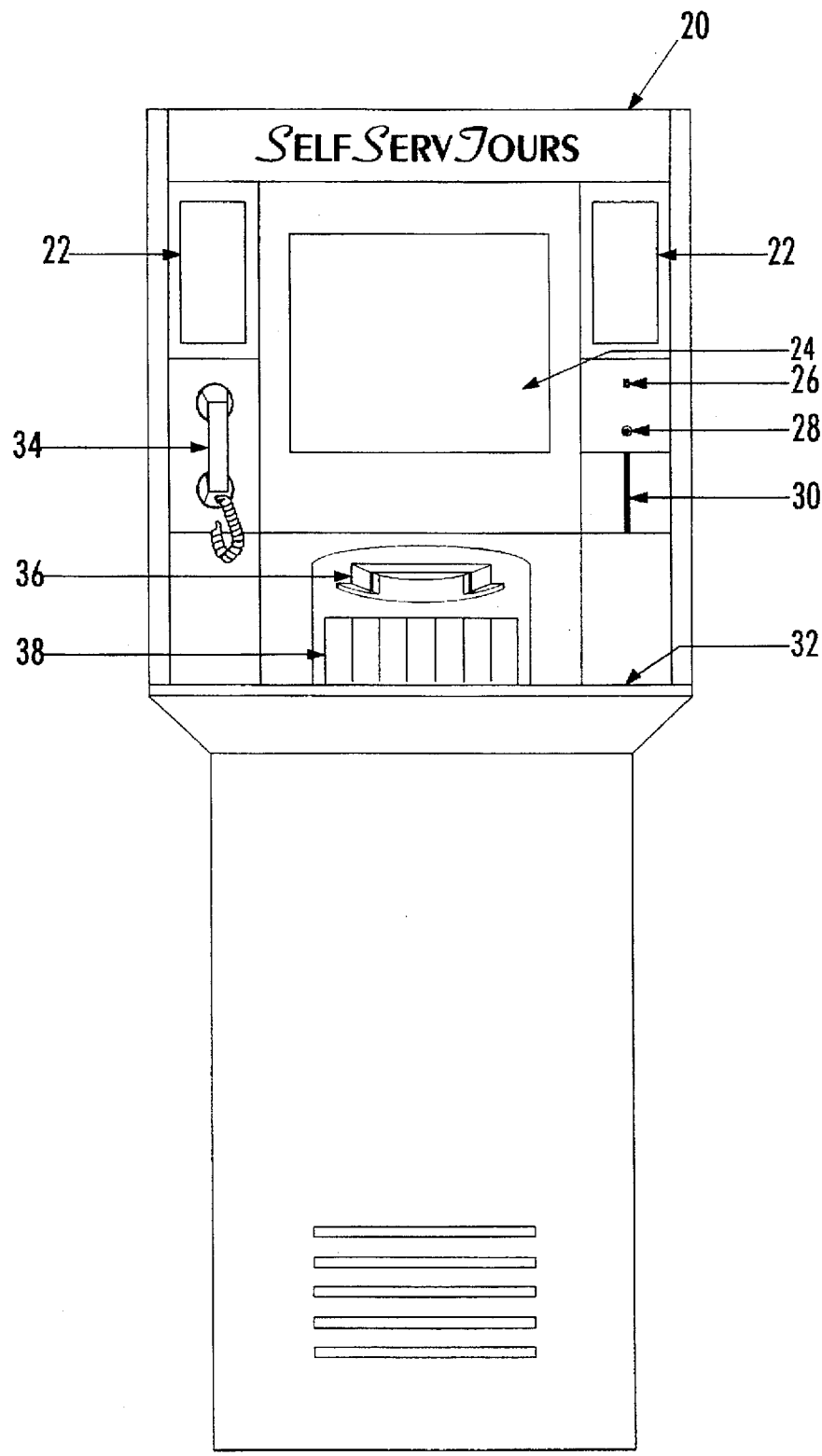
FIG. 1 is the front view of a kiosk to illustrate the invention.

FIG. 1 is a front view of a kiosk for self-service by users where the kiosk can assist the user by presenting information, qualifying the user, presenting recommendations where appropriate, closing a sale, confirming a reservation, accepting payment and delivering a value voucher to the user for the selected service or product. As shown in FIG. 1, kiosk 20 includes the following components:

Speakers 22 for the control system in the kiosk 20 to present audio information and entertainment to the user;

Touch-sensitive monitor and screen 24 to present video information and as an input device for the user to input information requested;

Microphone 26 for the user to communicate with a travel agent in the regional reservation center connected to the kiosk;

Jack for headset 28, where the headset replaces speakers 22 for the control system to communicate with the user;

Slot 30 for return vouchers for users to deposit a value voucher after buying a travel-related service or product, in case of exchanges or refunds if the user changes his or her mind or if the user realizes he or she made a mistake in the purchase;

Shelf 32 for the convenience of the user to place personal items;

Telephone handset 34 for communication with a travel agent when the user requires assistance, has out of the ordinary requests, if products or services are unavailable, or when the options presented by the control system in the kiosk 20 do not satisfy the user;

Card scanner 36 for scanning credit cards; and

Voucher dispenser 38 for dispensing a value voucher to the user for the purchase.

Figure 2A:
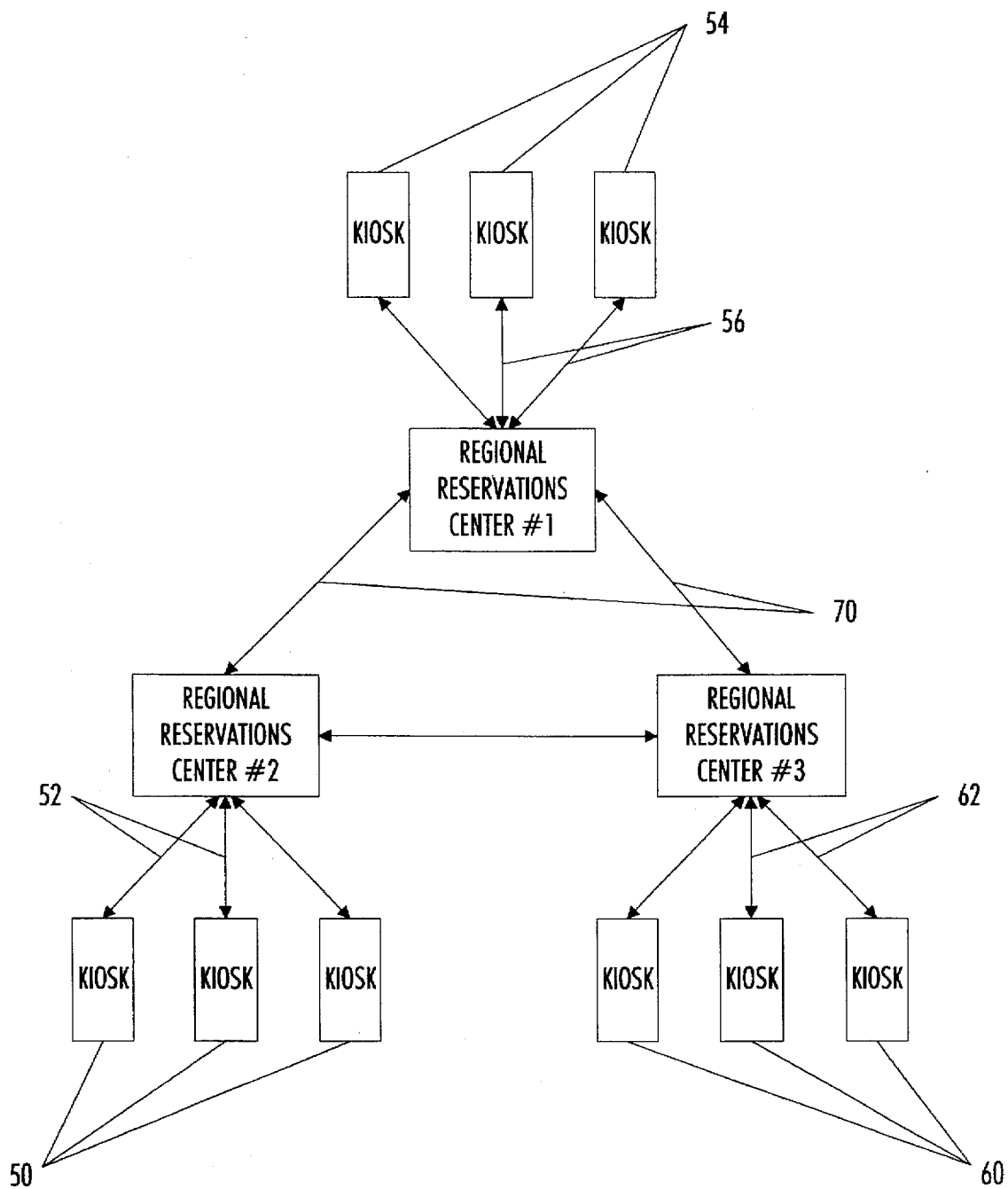
FIG. 2A is a schematic block diagram of a network for a self-service system for selling travel-related services or products to illustrate the preferred embodiment of the invention.

FIG. 2A is a block diagram of the network for an interactive electronic travel service system functioning like a travel agent and enables a self-service process of selling travel-related services or products to users to illustrate the preferred embodiment of the invention. The example of three regional reservation centers 1, 2, 3 are spread out geographically, (such as in different parts of a country), each center having a geographical region and a database including information on travel services and products within this region. For example, each of the regions with dense population centers or with many local tourist attractions may be equipped with a regional reservation center. Within the geographical region of each regional reservation center is a set of kiosks and two-way communication links linking the kiosks of a set to its corresponding regional reservation center. In FIG. 2A, for example, regional reservation center 1 may be located in Hawaii as its region, with a set of kiosks 50 located in Hawaii and connected to center 1 by means of two-way communication links 52. Regional reservation center 2 may be located in Southern California as its region. Kiosks 54 are located in Southern California and are connected to regional reservation center 2 by means of two-way communication links 56. Regional reservation center 3 may be located in Florida as its region. Kiosks 60 located in Florida are connected to regional reservation center 3 by means of two-way communication links 62.

While only three regional reservation centers are shown in FIG. 2A, it will be understood that it may be desirable to have more than three regional reservation centers while in some situations fewer number of regional reservation centers may be adequate; such and other variations are within the scope of the invention. Each pair of regional reservation centers are connected together by a two-way communication link 70. From the point of view of information management, it may be difficult to centralize the information on all local tourist attractions and the different offerings therefor for a large geographical area such as the U.S. at one central location. For this reason, it may be preferable to decentralize the information at different regional reservation centers, where information on travel services and products within a region would be stored at the regional reservation center for that region. When the user of a kiosk such as kiosk 50 in Hawaii wishes to tour attractions in Florida, the user at kiosk 50 can obtain the necessary information and close a sale through the two-way communication link 52 with regional reservation center 1 and through two-way communication link 70 with regional reservation center 3 in Florida. Information on the local attractions in Florida is stored in regional reservation center 3 and can be provided to the user through links 70 and 52.

Figure 2B:
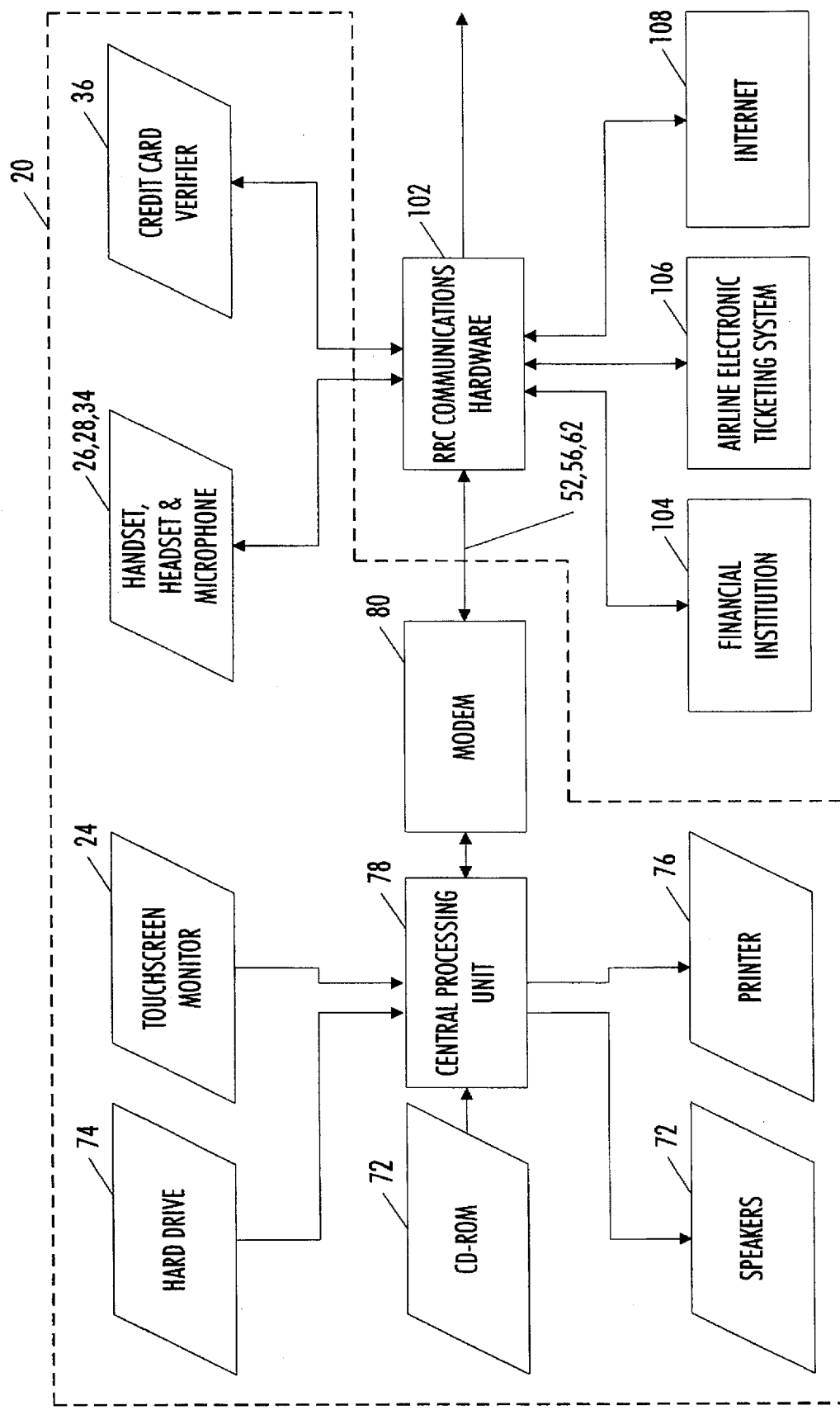
FIG. 2B is a block diagram illustrating in more detail the components of the kiosk of FIG. 1 and the communication connectivity to a regional reservation center to illustrate the preferred embodiment of the invention.
Figure 15A:
FIGS. 15A, 15B are schematic views of two different value vouchers to illustrate the preferred embodiment of the invention.
Figure 15B:
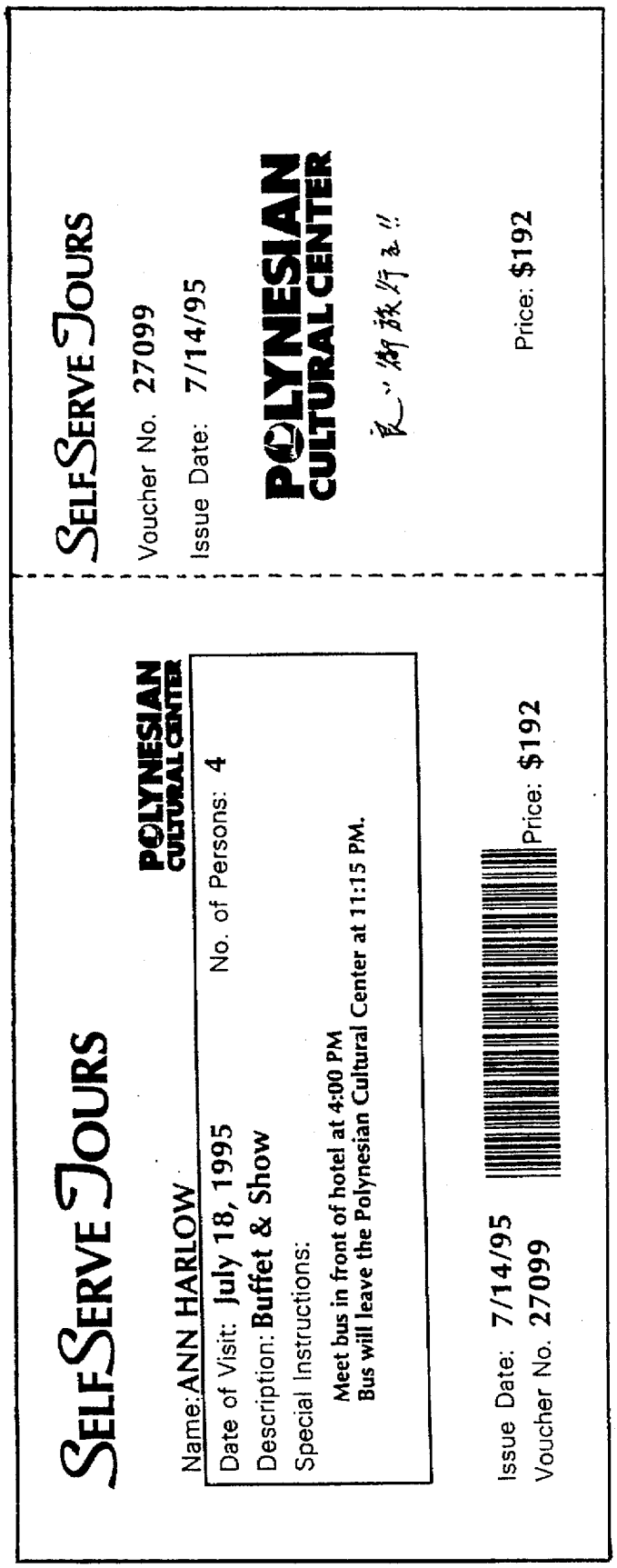

FIG. 2B is a block diagram illustrating the components of kiosk 20 of FIG. 1, the links to the communications hardware portion 102 of a regional reservation center, financial institution airline electronic ticketing system, and the Internet to illustrate the preferred embodiment of the invention. Kiosk 20 includes a CD-ROM 72 used for storing video and audio information to be presented to the user where such information is of such a nature that it does not need to be updated frequently. As will be described below, information of a general nature such as the continuous attract loop welcoming video and other features less susceptible to change can be stored in this component 72. The hard drive 74 will be used to store video and audio information that require frequent updates, including additions, deletions and changes. A data exchange method of updating kiosk data from a regional reservation center and vice versa will be performed through the modem 80. A printer 76 is also provided for printing value vouchers of the type shown in FIGS. 15A, 15B so that the voucher can be dispensed through dispenser 38 of FIG. 1. The printer will also have the capability of printing information cards and receipts.

Speakers 22, touch screen 24, hard drive 74, CD-ROM 72, and printer 76 are all controlled by a central processing unit (CPU) 78 in the kiosk which communicates with hardware 102 through a modem 80. Hardware 102 communicates with a financial institution 104 for conducting credit card transactions with credit card scanner 36. Hardware 102 also communicates with an airline electronic ticketing system 106 for issuing documents for air transport purchases. Hardware 102 also communicates with the Internet 108 for issuing documents for various purchases and reservations made through the Internet.

Hardware 102 communicates with central processing unit 78 through modem 80. The video and audio files in the kiosk hard drive 74 will be updated from the regional reservation center to reflect current prices and current product information. The communication link will make it possible for the regional reservation center to respond to kiosk inquiries regarding inventory availability. Communication will be in both directions. As products and services are sold at the point of sale kiosks the sales information will be transmitted to the regional reservation center to update the inventory files stored in the regional reservation center.

The communication links 52, 56, 62 between hardware 102 and modem 80 may be ordinary telephone lines, but also can be dedicated digital telephone lines, fiberoptic cables, or wireless communication. The communication link between hardware 102 and outside institutions 104, 106, 108 can also be an ordinary telephone line, digital telephone line, fiberoptic cable, or wireless communication.

Figure 2C:
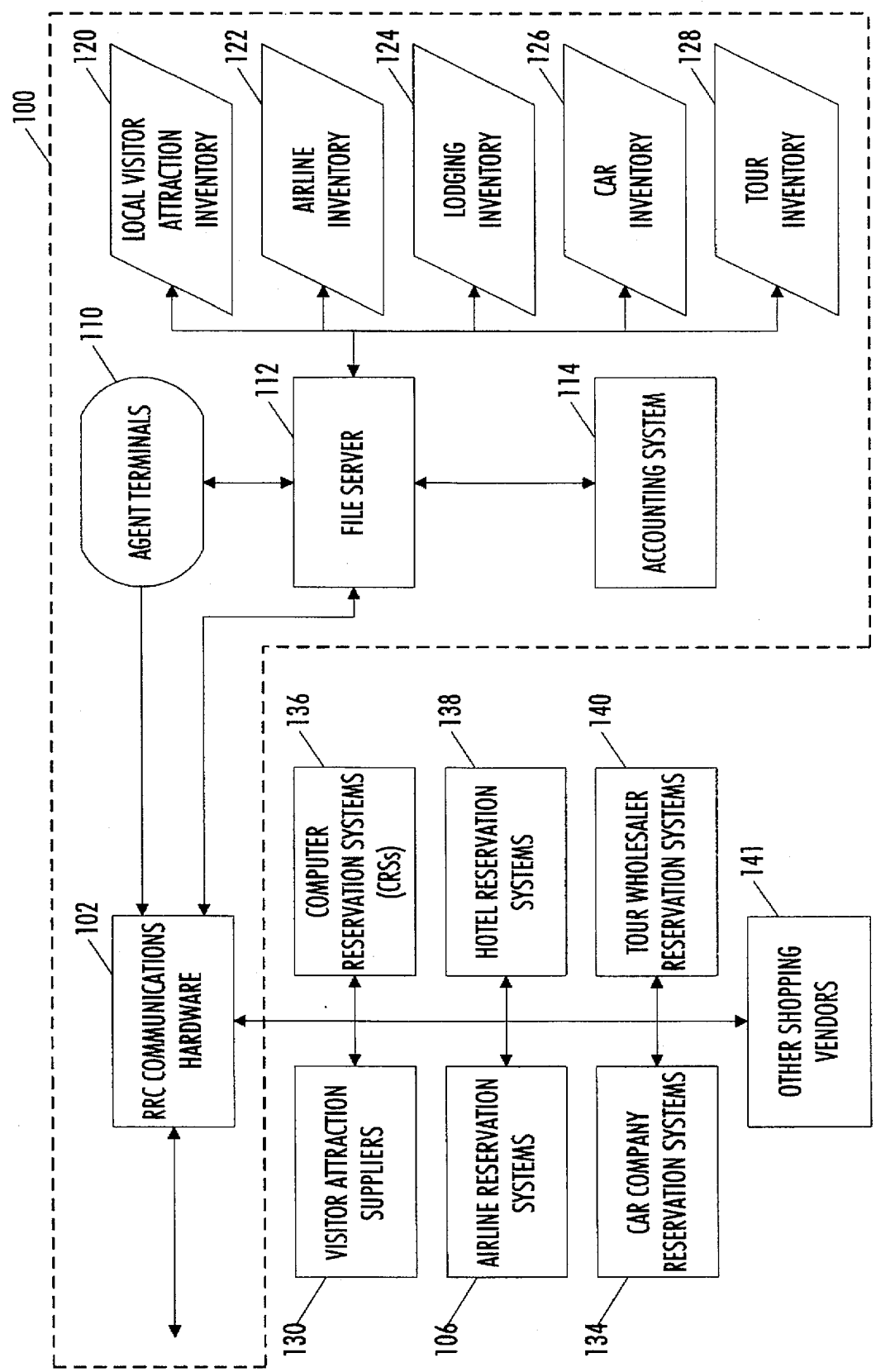
FIG. 2C is a block diagram illustrating in more detail the components of a regional reservation center and the communication link to the different vendors for supplying travel-related services and products to illustrate the preferred embodiment of the invention.

FIG. 2C is a block diagram illustrating in more detail the components of the regional reservation center (RRC) 100 and of outside vendors supplying information on services and products available to a user. Center 100 includes communications hardware 102, agents' terminals 110, file server 112, and an accounting system 114 for keeping track of the purchases made by user of kiosk in communication with center 100. File server 112 controls hardware 102, agents terminals 110, and the accounting system 114, and controls the storing, updating and fetching of information in local visitor attraction inventory 120, airline inventory 122, lodging inventory 124, car inventory 126, and tour inventory 128 in the memory. File server 112 obtains the information of these five categories of inventory from outside vendors and update such inventory periodically; such information is obtained from vendors such as visitor attraction suppliers 130, airline reservation systems 106, car company reservation systems 134, computer reservation systems (CRSs) 136, hotel reservation systems 138 and wholesaler reservation systems 140. File server 112 can also check with any one of the vendors through hardware 102 whether the travel service or product for a particular date and time is available. As products and services are sold, the sales information, which may include delivery information, is transmitted to vendors through file server 112 and hardware 102.

Figure 3:
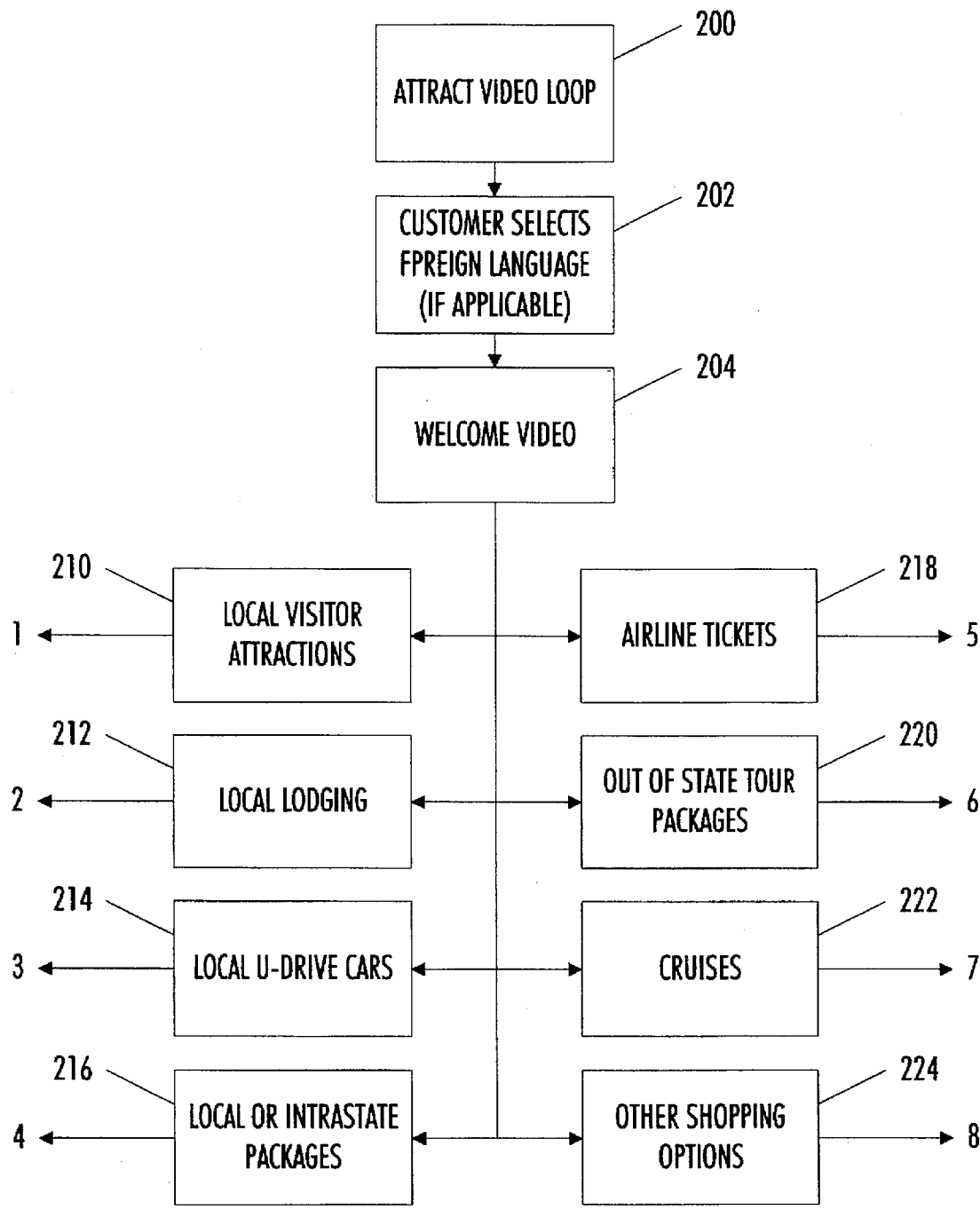
FIG. 3 is a flow chart illustrating a procedure for presenting a number of options of different travel-related services and products to a user of the self-service kiosk of FIG. 1 to illustrate the preferred embodiment of the invention.

The operation of the interactive electronic travel service system functioning as a travel agent will now be described in reference to FIG. 3 which is a flow chart illustrating a process representing general information and the basic options available to a user planning and purchasing a trip. As shown in FIG. 3, CPU 78 initiates two way communication between system 20 and the user by first causing an attractive video to be presented in a loop to attract the attention of potential customers who may wish to purchase travel-related services and products (block 200). Where applicable, CPU 78 may also cause a choice of a foreign language to be selectable by the customer by pressing an appropriate button (not shown) on the touch sensitive screen 24 for communication between the system and the user (block 202).

CPU 78 then causes a welcome video (block 204) to be presented to the user (in the language selected, if applicable). CPU 78 then causes a basic option screen on monitor and screen 24 to be presented to the user; in the preferred embodiment illustrated in FIG. 3, eight options (local visitor attractions, local lodging, local U-drive cars, local or intrastate tour packages, airline tickets, out-of-state tour packages, cruises and other shopping options) are presented. See blocks 210–224. While the initiation of two way communication is preferably as described, it will be understood that many other ways of accomplishing the same goal can be used and are within the scope of the invention.

Figure 4A:
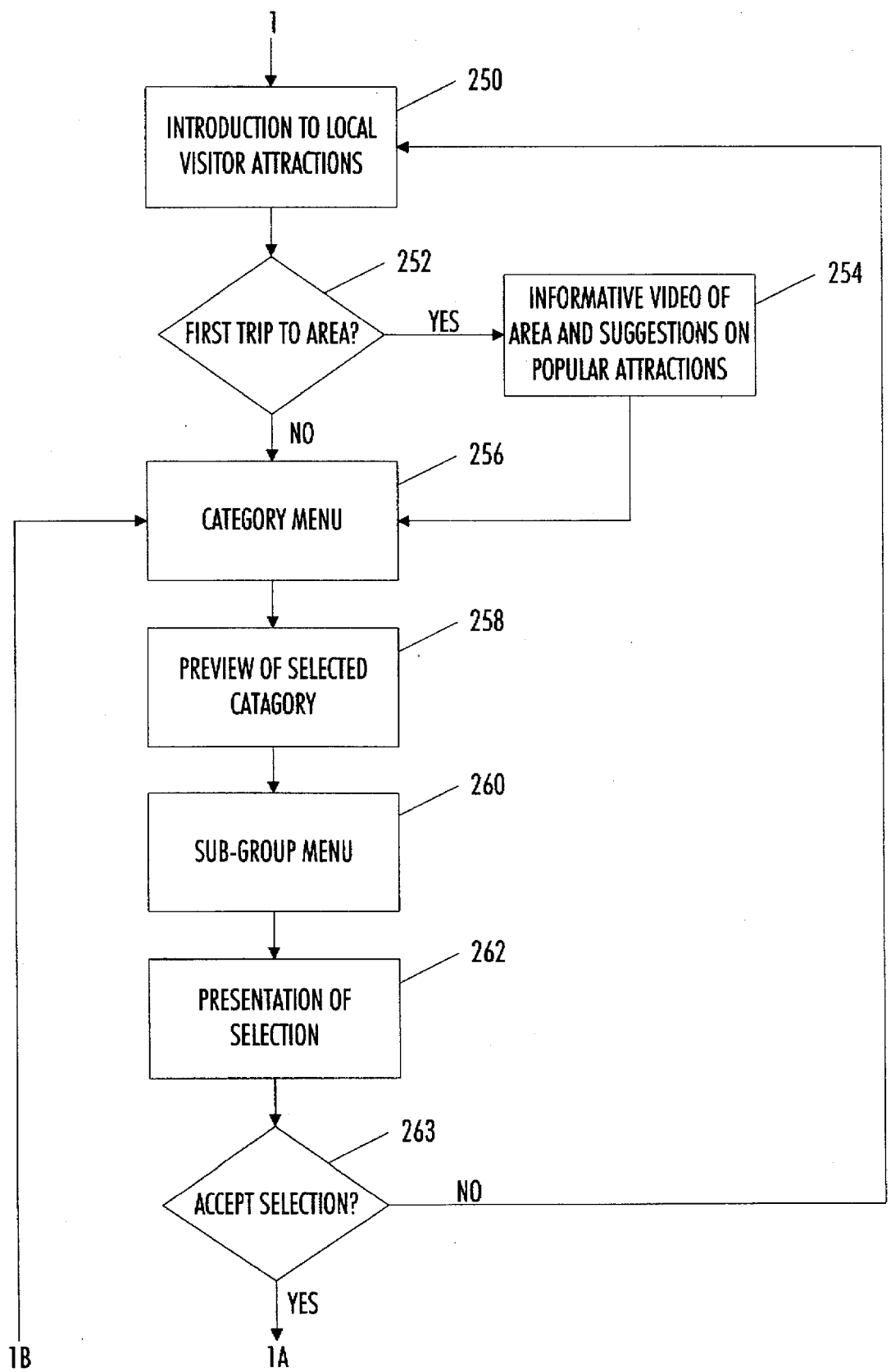
FIGS. 4A, 4B and 4C are flow charts illustrating a process of presenting information, assisting the user to select, closing a sale querying the user to input date(s), the number of persons in the party and a name to hold the reservation, displaying the confirmation of the sale, accepting payment, and delivering a value voucher to the user for local visitor attractions option of FIG. 3 to illustrate the preferred embodiment of the invention.
Figure 4B:
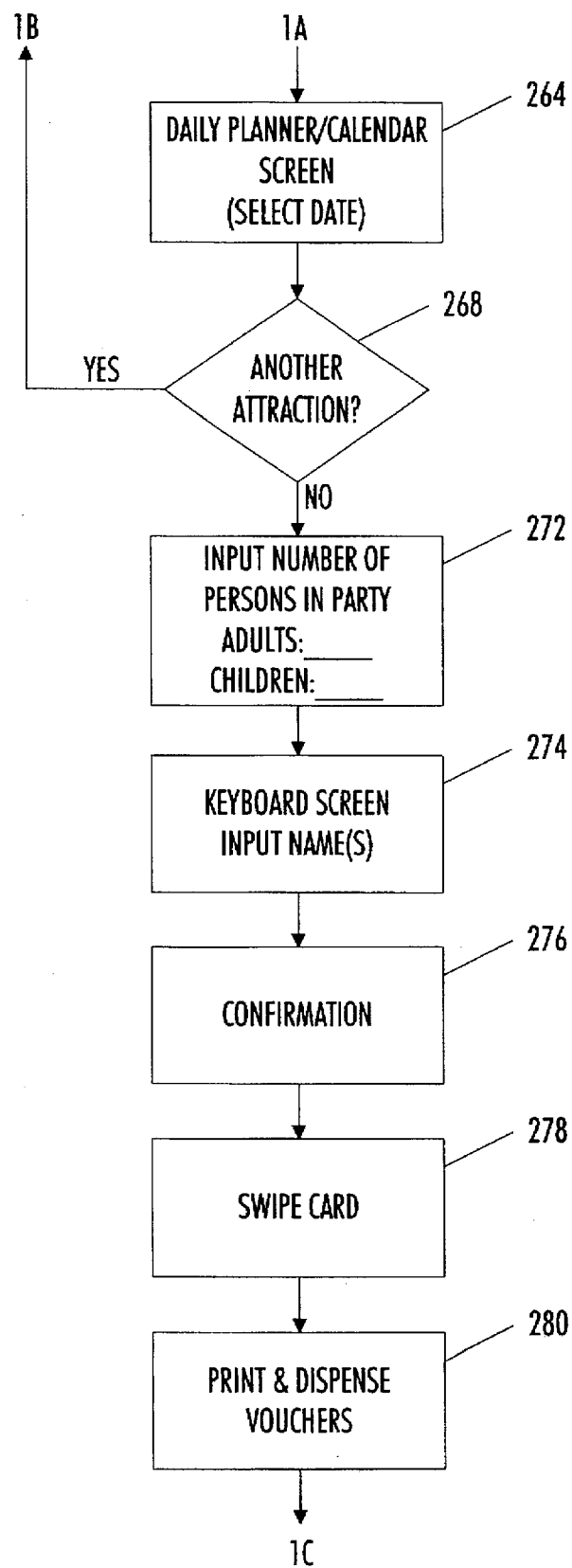
Figure 4C:
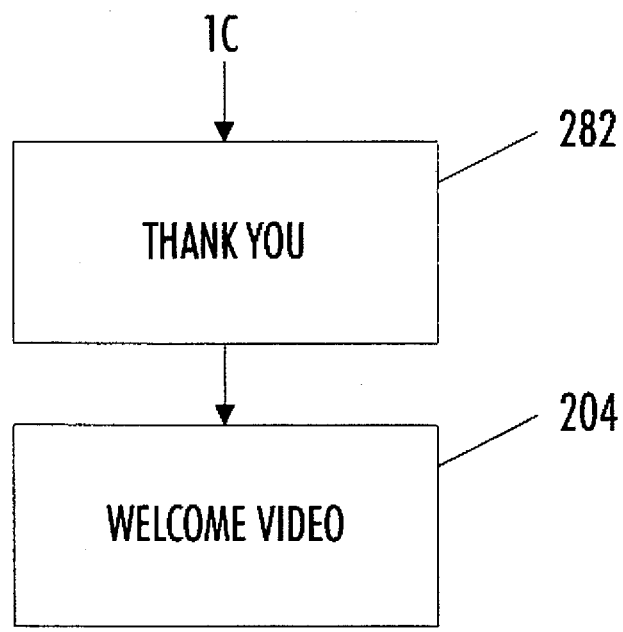

If the user selects local visitor attractions option by pressing the box therefor on the touch-sensitive screen 24, CPU 78 would cause the local visitor attractions routine of FIGS. 4A, 4B, 4C to be activated. First, an audio video introduction to local visitor attractions is presented as controlled by CPU 78 and the CPU causes a screen to be displayed to query the user as to whether this is the user's first trip to the destination of the local visitor attractions as well as general familiarity with the destination (diamond 252). If the user indicates that he lacks travel knowledge of the destination by touching the "yes" button of the touch screen, an informative video of the area is presented as well as suggestions on popular attractions that are a "must" for the first-time visitor (block 254) and then a category menu of the various local visitor attractions is then presented on the monitor screen of the touch screen 24 (block 256).

If the user chooses to touch the "no" button on the screen 252 indicating that either the user is a repeat visitor or otherwise is familiar with the destination, then the system proceeds directly from diamond 252 to present the category menu (block 256). The category menu may list major groups of activities such as: daytime sightseeing activities, action or sports activities, amusement parks and evening activities. After the user selects a category group by touching the appropriate box on a touch screen 24, a preview of short video clips will be shown to prompt the user to make a selection (block 258) and a more detailed subgroup menu listing the activities will follow (block 260). Upon the user making a selection, a more detailed video of the selected activity will be presented with the objective of closing the sale (block 262). The detailed video will present the selected activity in a very favorable light to coax or influence the user to press the acceptance "YES" button on the touch screen 24. If the user touches the "yes" button on the screen, a daily planner/calendar screen will be shown to assist the user to select a date (block 264). If the user presses the "no" button instead, the CPU 78 will cause the system to return to block 250 (diamond 263).

Figure 12:
FIG. 12 is an illustration of a daily planner and calendar touch screen used to assist the user in planning and inputting the desired dates for visitor attractions to illustrate the preferred embodiment of the invention.
Figure 12:
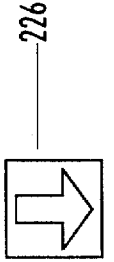

FIG. 12 is a schematic view of a daily planner/calendar to assist the user to select the dates for various local attractions. A multiple year calendar is built into the system. The first date appearing on the calendar will be the current date when the user is making the selection. In the preferred embodiment, three weeks will be shown on the screen. If the visitor is on an extended vacation, the user can scroll down to the desired date using arrow 226 in FIG. 12. The screen in FIG. 12 depicts an example where the user has already selected an Arizona Memorial Tour on Thursday, May 25th. After making such selection, the user is asked whether another attraction is desired (diamond 268 in FIG. 4B, box 270 in FIG. 12). If the user has then decided to select an Atlantis submarine ride on the morning of May 27th, the user would then press the "yes" button on the screen in FIG. 12 and the system would then return to the category menu (block 256) in FIG. 4A in order to assist the user in deciding whether to confirm the selection of the submarine ride. The attraction previously selected (i.e. Arizona memorial) stays on the daily planner/calendar so as to assist the user in scheduling activities during the limited time on vacation.

If the selection made by the user is the last selection and the user presses the "no" button in box 270 in FIG. 12, the system then proceeds to block 272 by asking the user to input the number of persons in the party and whether such persons are adults or children. The system then shows a keyboard screen such as one shown in FIG. 14 and asks the user to input the name or names of the party. The name of the activity or product that is being reserved by the user appears on the top of the screen in FIG. 14. After input by the user, CPU 78 causes a confirmation to be displayed on screen 24, listing the activities selected, the dates, and the name(s) of the party holding the reservation, the prices of each activity and the total amount due. See blocks 274, 276. The confirmation screen can display both text and video information. The user is then requested to swipe a credit card, and the system prints and dispenses vouchers through dispenser 38, and shows a "thank you" screen. See blocks 278–282.

The system then returns to the welcome video 204 in FIG. 3 in case the user wants to select another service or product. In this manner, the user has the choice of selecting any number of options at one sitting. If the user pauses for over a predetermined time limit at any time in the process described herein in reference to FIGS. 3–11, the system will return to block 200 to show the attract video.

The two-way communication between the user and the regional reservation center is such that the travel agent located at a regional reservation center knows the location of any kiosk that is in two way communication with the center, so that the agent can give directions to the user, such as the most convenient pick-up point to board a tour bus, for example. This information is also very important to the tour bus company since it would have to know where to pick up a customer at a precise time selected by the customer.

Figure 5A:
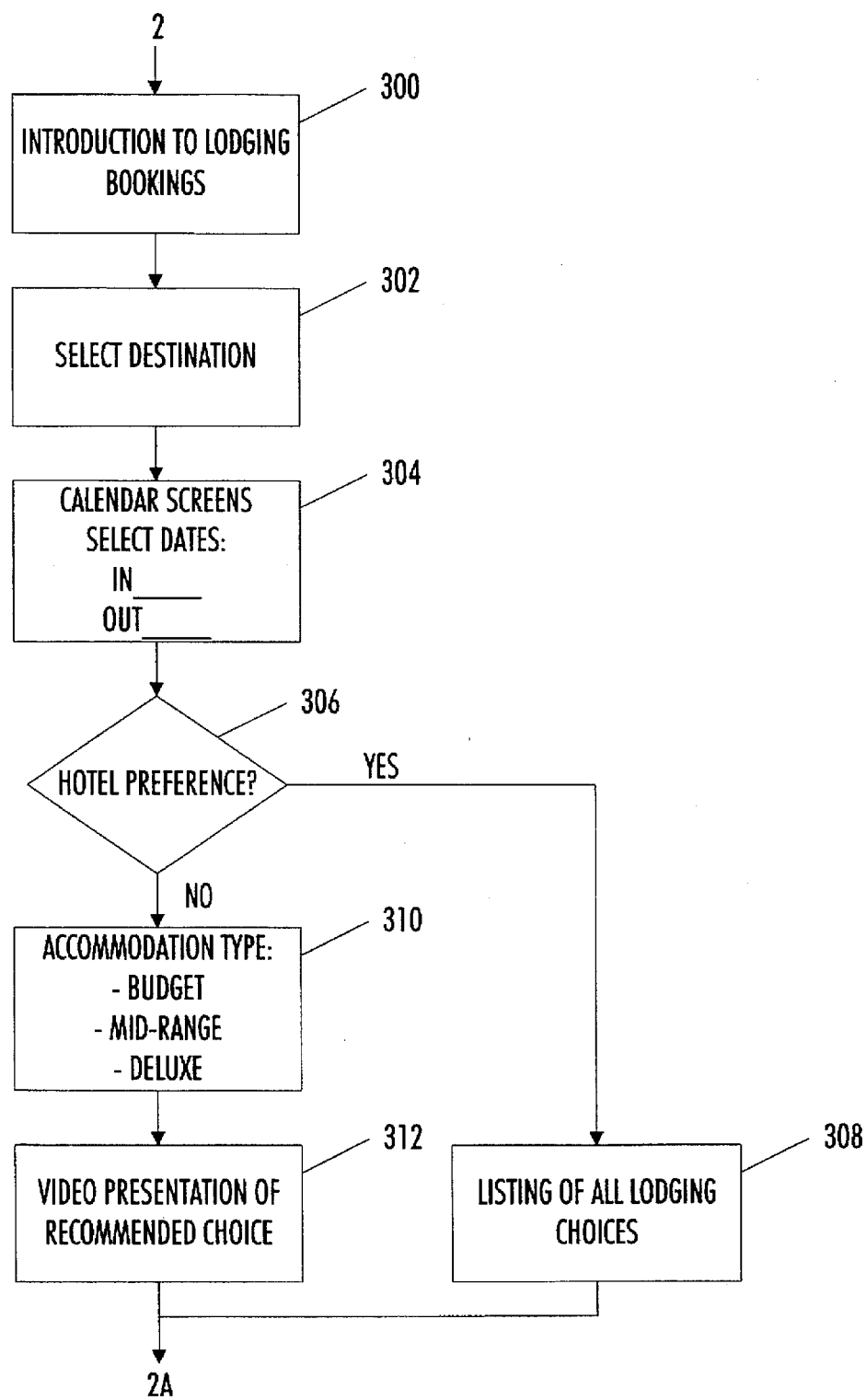
FIGS. 5A, 5B together are flow charts illustrating a procedure for presenting information qualifying the user, assisting the user to select, making a sale, accepting payment, and delivering a value voucher to the user for local lodging bookings option of FIG. 3 to illustrate the preferred embodiment of the invention.
Figure 5B:
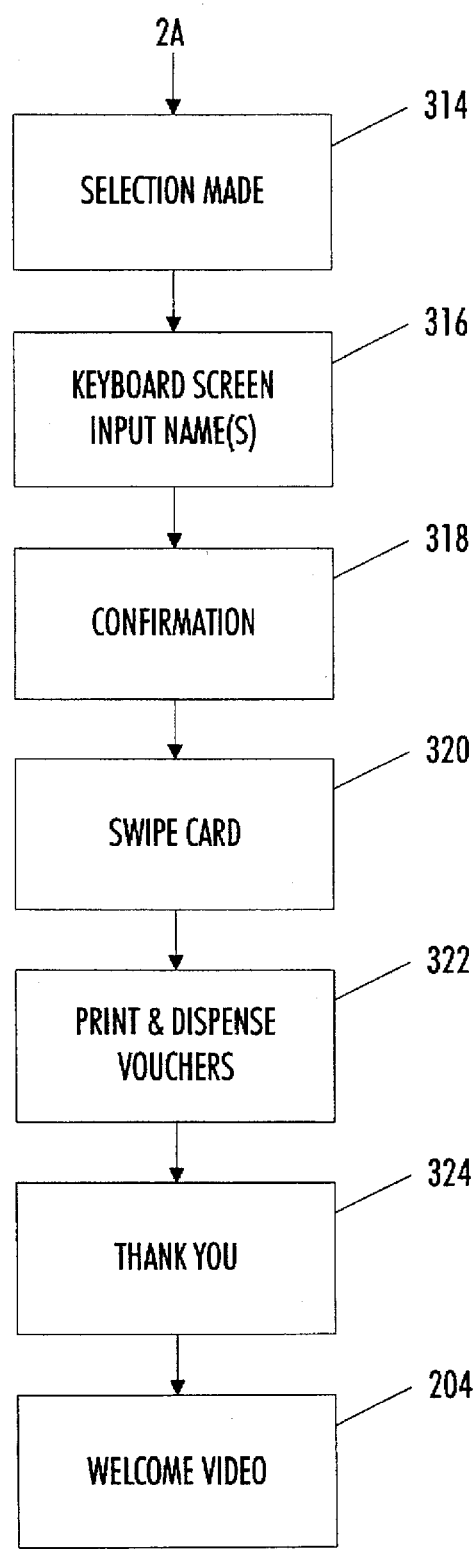

In reference to FIG. 3, if the user selects the "local lodging option" 212 by pressing the appropriate button on screen 24, CPU 78 will cause the system to activate the routine in FIGS. 5A, 5B.

Figure 13:
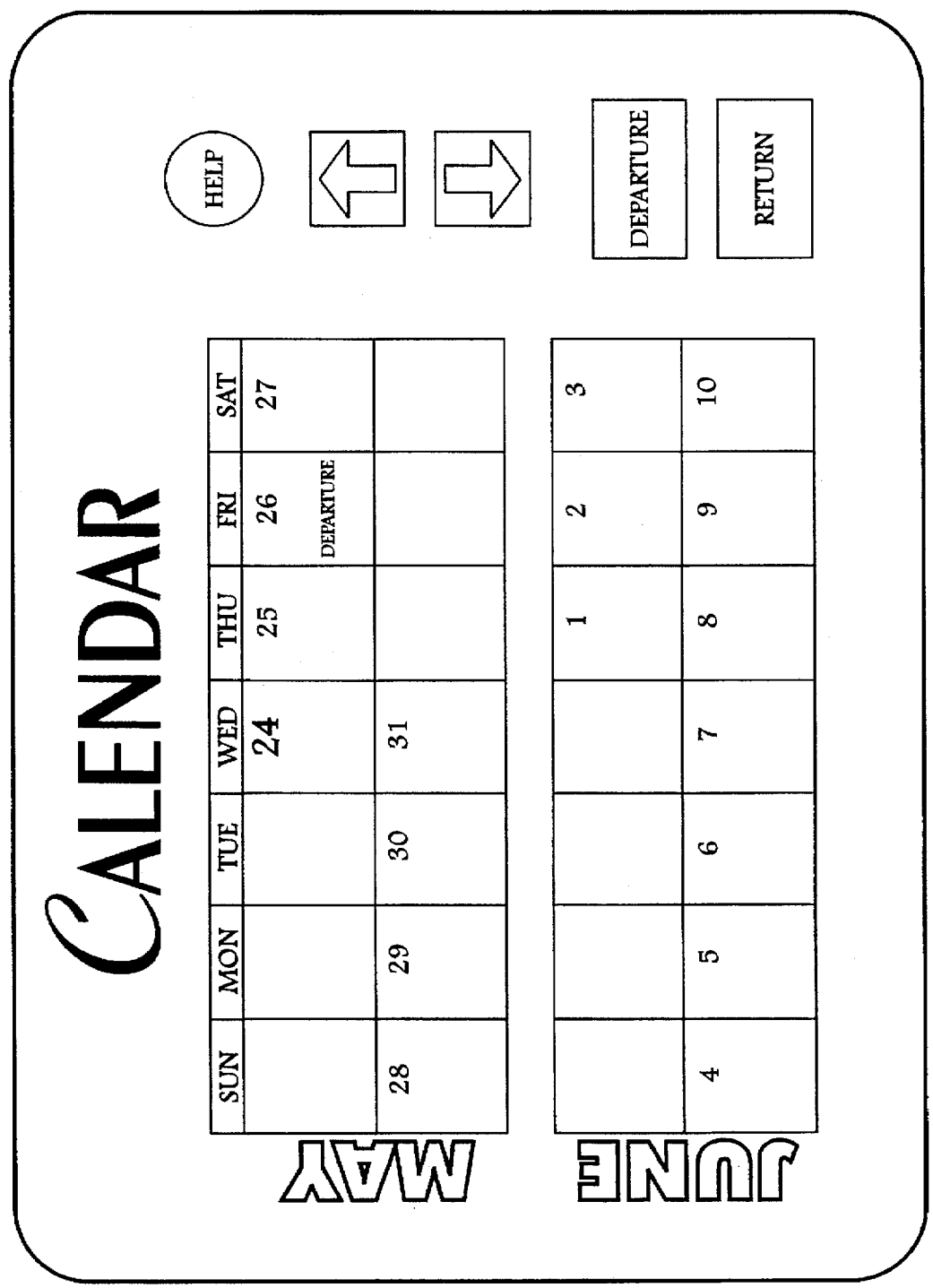
FIG. 13 is an illustration of a calendar touch screen for assisting the user to input departure and return dates of travel to illustrate the preferred embodiment of the invention.

The CPU 78 causes the system to present on the screen 24 an audio visual presentation on lodgings block 300. The user is queried to select a destination area, block 302. Then a calendar screen such as that shown in FIG. 13 will appear, block 304. The user is requested by the calendar screen to select the check-in and check-out dates (instead of departure and return date as shown in FIG. 13). The first date on the calendar will be the current date when the user is making the selection. Once the check-in date has been inputted and the user is queried to select his or her check-out date, the calendar will be updated so that the first date appearing on the calendar will be the check-in date. This is to insure that the user will not mistakenly input a check-out date prior to his or her check-in date.

The user will be qualified by querying the user as to whether he or she has a hotel preference (diamond 306). If the user indicates that there is by pressing the "yes" button on the screen, the system then proceeds to block 308 to present a listing of all lodging choices. If the "no" button on screen 24 is pressed instead, the system then queries the user as to the type of lodgings desired in accordance with a desired lodging category such as: budget, mid-range or deluxe (block 310). After the user has selected one of the categories, the system then proceeds to search the hotel inventory database 124 of FIG. 2C and its memory for availability or alternatively the system checks with hotel reservation systems 138 of FIG. 2C in real time for availability. In either case, the system in block 312 would present a recommended choice for an available lodging booking. For users who have hotel preferences, the system in block 308 will present all available lodging choices for selection by the user. Therefore, whether or not the user has a preference, the user is asked in blocks 308, 312 to make a decision and select a choice (block 314).

The recommendation in block 312 is made on the basis of a predetermined priority system. After a recommendation is arrived at, or after a user having a preference has made a selection, the system causes an audio video presentation of the recommended choice to appear on screen 24. If the user still cannot make a decision, a screen will appear (or an audio instruction will sound) to instruct the user to touch the HELP button on the screen. In accordance with one implementation of the invention, if the user selects the deluxe category, all deluxe hotels in the inventory will be listed. If the user desires a hotel in a deluxe category not in the inventory system, the system will automatically connect the user to a travel agent to intercede.

In an alternative embodiment, if the user cannot make a decision after viewing the video presentation of the recommended choice in block 312, the user is instructed to press the HELP button that will cause a sub-routine to be activated to offer one or two choices that are different from the first recommended choice based on the predetermined priority system.

Figure 14:
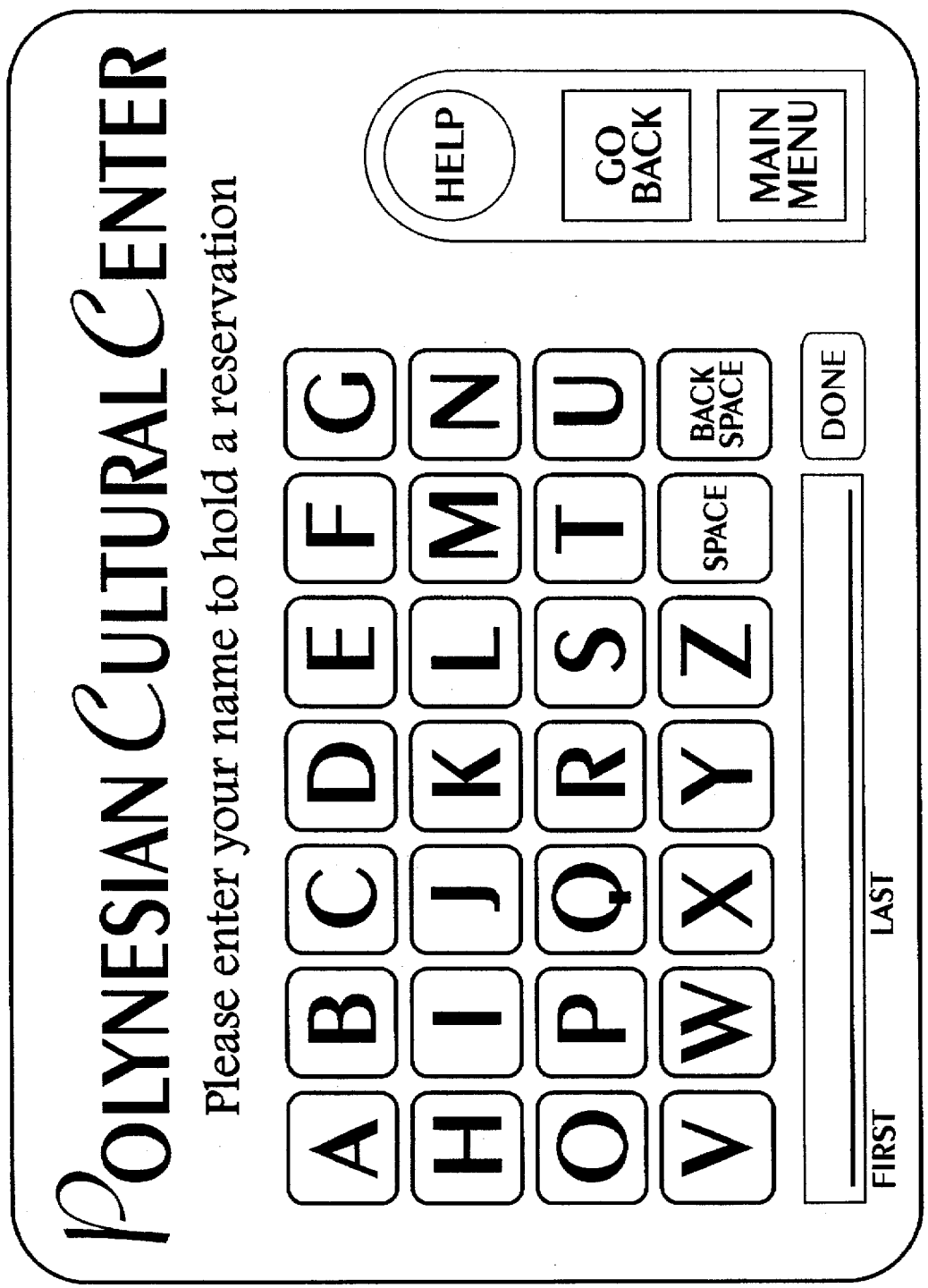
FIG. 14 is an illustration of a keyboard touch screen for the user to input a name or names to hold a reservation.

After the selection has been made according to block 314, a keyboard screen such as that in FIG. 14 will appear to assist the user to input a name for a hotel reservation appearing on top of the screen (block 316). The system will then cause a confirmation screen showing the reservation and the total amount due to appear (block 318) and the user is asked to accept the confirmation by pressing a "yes" button on the screen. If for some reason the user does not want to confirm the purchase, he can press the HELP button and an agent will intercede. The user is then asked to swipe a credit card and a value voucher is then printed and dispensed in a manner described above and a thank you screen will appear. See blocks 320–324. The system then returns to the welcome video 204 in FIG. 3.

To simplify the selection process, in one embodiment, "Run of House" room rates (i.e. same price for all room categories) are offered to participating hotels and inventory of available rooms under such system will be maintained in the regional reservation center connected to the kiosk in communication with the user. Where possible, it may be desirable to check with the vendor through the hotel reservation system 138 to provide real-time inventory information. If this is not possible, room blocks will be contracted with hotels and a current inventory of blocked rooms will reside in database 124 in the regional reservation center in communication with a kiosk used by the user.

Figure 6A:
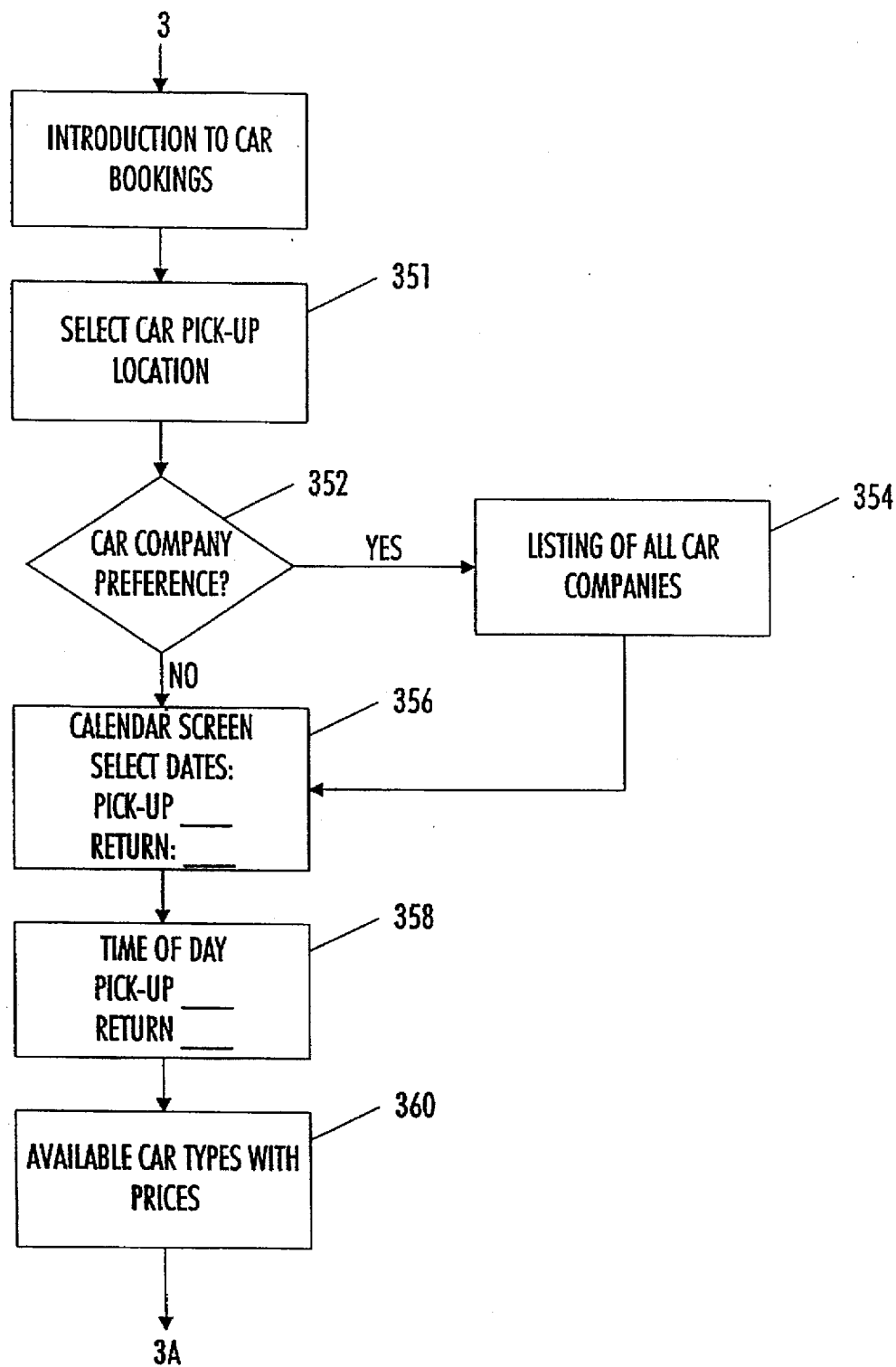
FIGS. 6A, 6B are flow charts illustrating a process for presenting information, querying the user for a preference, assisting the user to select, closing a sale, accepting payment and presenting a value voucher to the user for car bookings option of FIG. 3 to illustrate the preferred embodiment of the invention.
Figure 6B:
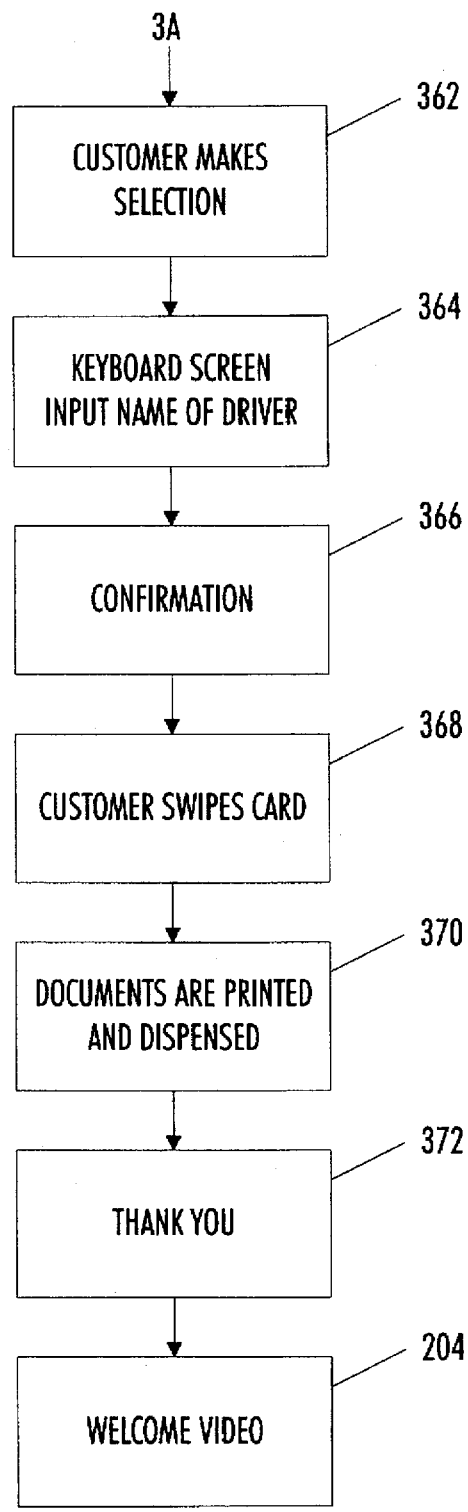

In FIG. 3, if the user selects the local U-drive cars option 214, CPU 78 would activate the subroutine therefor in FIGS. 6A, 6B. The user is queried to select a destination area where the user wishes to pick up the car (block 351). The user will then be qualified by querying the user to determine if the user has a preference for a U-drive company (diamond 352). If there is, a listing of all car companies will appear (block 354) and the user is asked to select the preferred car company. After such selection or if the user has no preference, the system then displays a calendar screen to ask the user to input the pick-up and return dates (block 356), and preferably also the time of day of pick-up and return (block 358). The system also displays on screen 24 the available car types with prices (block 360). If the user has no preference, the system would select a vendor based on a predetermined priority system for display in accordance with block 360. Prices will be displayed for each car type and any sold-out conditions will be displayed on the listing as well. The local inventory of cars will reside in the regional reservation center in database 126 where the inventory will be updated through direct data links in real time with car company reservation system 134 through communication hardware 102. In cases where this is not possible, the inventory will be based on contracted blocks with participating car rental companies and stored in database 126. The system will automatically connect the user to a travel agent if there is no inventory for a given location or date. The user is asked to select a car type for the location and dates inputted, and after the selection has been made (block 362), the keyboard screen of FIG. 14 will be shown to ask the user to input the name of the driver (block 364). Thereafter, a confirmation screen showing the reservation and the total amount due will appear (block 366). If for some reason the user does not want to confirm the reservation, he can press the HELP button and an agent will intercede. The user is asked to swipe a credit card, upon which a value voucher will be printed and dispensed as before and a "thank you" screen is shown (blocks 368–372). The system then returns to the welcome video 204 in FIG. 2.

Figure 7A:
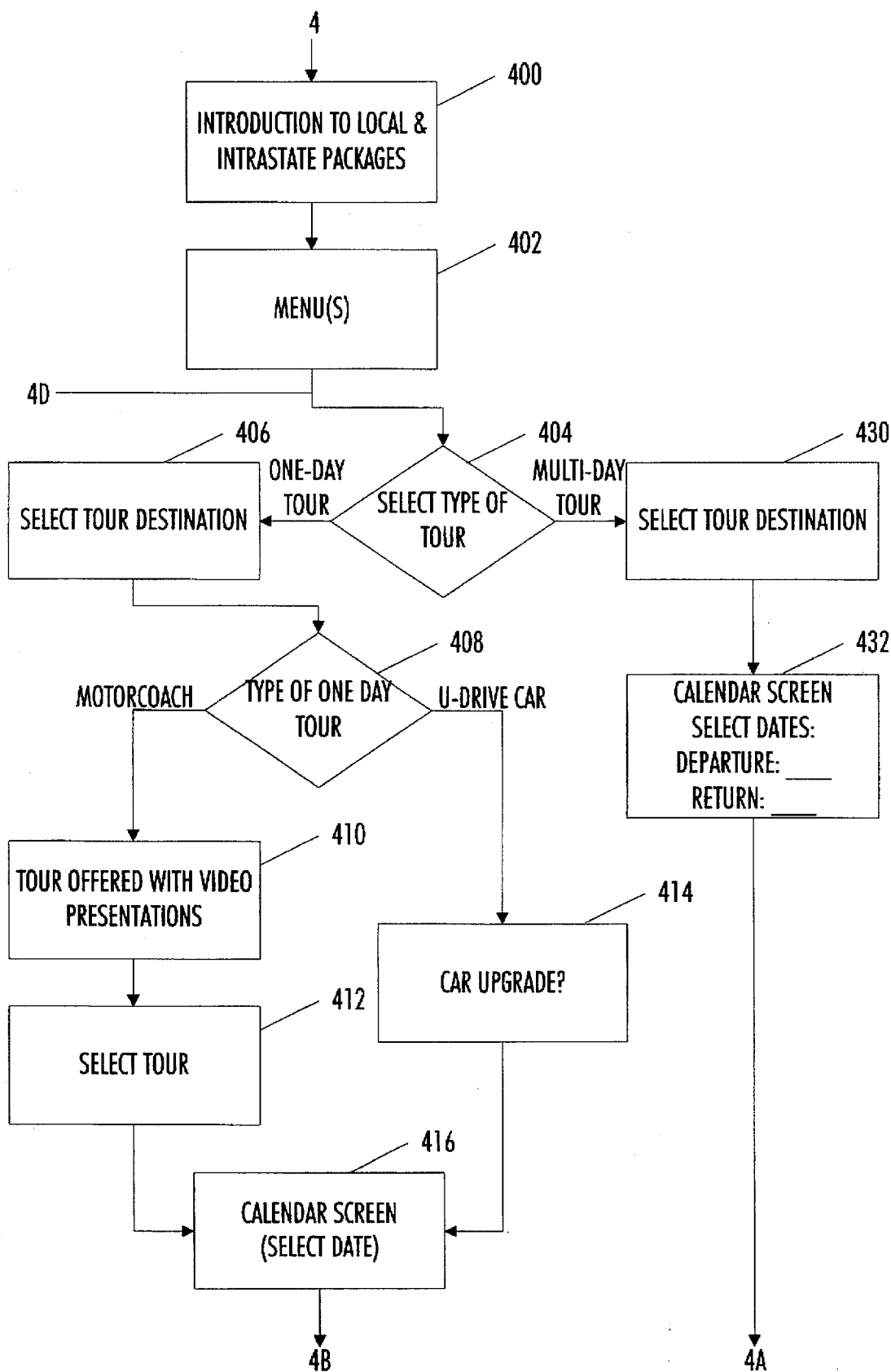
FIGS. 7A, 7B and 7C are flow charts illustrating a process for presenting information, qualifying the user, assisting the user to select, making a sale, accepting payment, and presenting a value voucher to the user for local and intrastate tour packages option of FIG. 3.
Figure 7B:
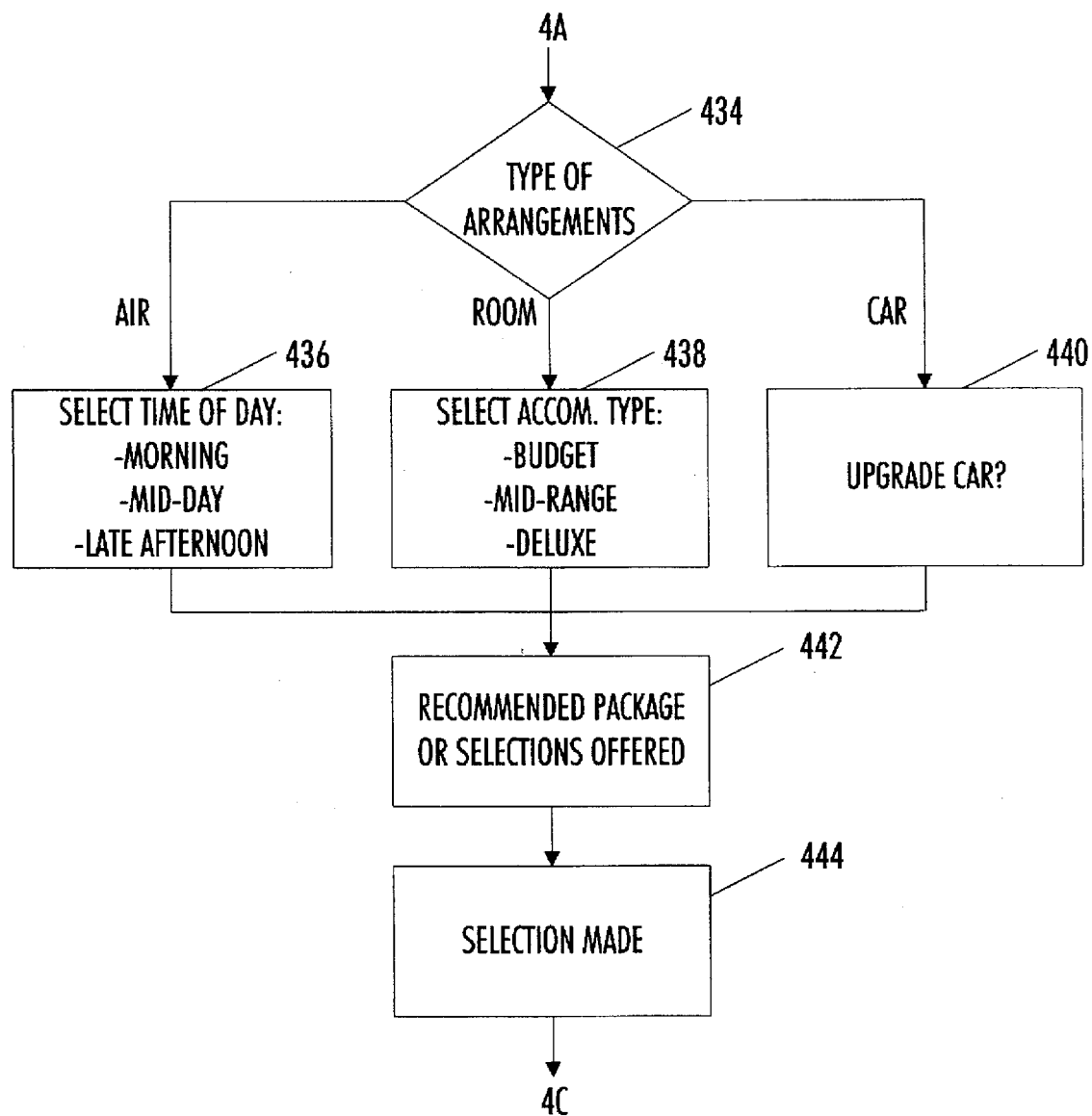
Figure 7C:
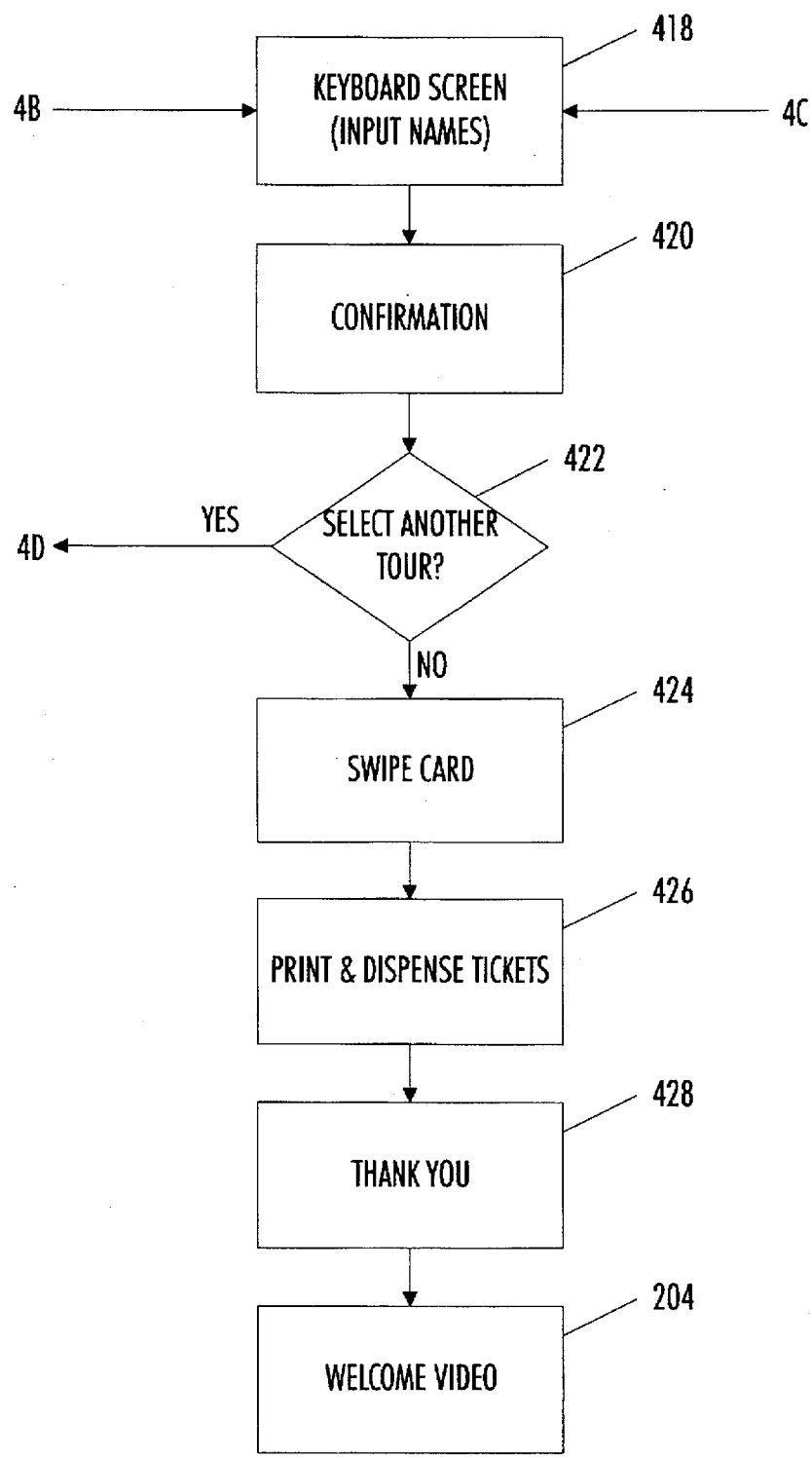

In reference to FIG. 3, if the user presses the button for local or intrastate tour packages 216, CPU 78 would activate the routine therefor as illustrated in FIGS. 7A–7C. Following the audio visual introduction to local and intrastate tour packages, a menu will appear listing the major packages (blocks 400, 402). For example, in the Hawaii market, the major tour packages will be trips between the islands. From the island of Oahu, tours will be offered to Kauai, Maui, Molokai, Lanai and Hawaii (the Big Island). These tours will be divided into one-day and multi-day packages. The user is asked to select the type of tour, that is, whether a one-day or multi-day tour is desired (diamond 404). If the user selects a one-day tour, he will be queried to choose a tour destination using the touch screen 24 (block 406). In the Hawaii example, it will be a choice of island. A video will present highlights of all the islands. After selecting an island, the user would be asked to choose between a guided motorcoach tour or a self-guided tour with an air and car package (diamond 408).

If the motorcoach option is chosen, a video will show highlights of the various tours and the menu will be presented to allow the user to select one of the tours using the touch screen monitor (blocks 410, 412). If the user chooses the self-guided tour package, a compact car will be offered with round-trip airfare together with pricing information, and the customer will be queried as to whether a car upgrade is desired (block 414). If the customer wishes a car upgrade, a menu will appear showing additional costs for various upgrades. After the user has chosen a car in a self-guided tour option or selected the option of a particular motorcoach tour, a calendar screen such as that of FIG. 13 will be shown to enable the user to input the date of either the motorcoach or self-guided tour (block 416). As shown in FIG. 7C, a keyboard screen such as that of FIG. 14 would then appear (block 418) to enable the user to input a name or names for the reservation. In the Hawaii example, the user will be instructed to input the names of all persons in the party since air transportation is involved. If air travel is not part of the package, only one name will be requested to hold the reservation. A confirmation screen will then appear showing the tour selected and the amount due (block 420) and the user is queried as to whether another tour is desired (diamond 422). If the answer is "no", the user is asked to swipe a credit card and a value voucher is dispensed as before and a "thank you" screen will appear. See blocks 424–428. The system then returns to the welcome video 204 in FIG. 3. If the answer is "yes", the system returns to diamond 404 in FIG. 7C.

If the user desires a multi-day tour, the user will be queried to choose a destination (block 430 of FIG. 7A). A calendar screen such as that of FIG. 13 will appear for the user to input departure and return dates (block 432 of FIG.

7B). The user will then be queried to select the components of the package (diamond 434 of FIG. 7A). The three components may include: air transportation, lodging accommodations, and a rental car. The user will have a choice of combining any of these components by pressing the appropriate buttons on the touch screen monitor. If air transportation is desired, the user will be queried on the time of day for departure and return, such as morning, midday, late afternoon or evening (block 436). In selecting lodging, the process will be similar to that described above in reference to FIGS. 5A, 5B. If a rental car is desired, the process will be similar to that described above in reference to FIGS. 6A, 6B. These steps are performed in reference to blocks 438, 440 of FIG. 7B.

As a consequence of the input data by the user, a recommended package will be offered to the user (block 442). The recommendation will be based on a predetermined priority system for each component. The recommendation screen also asks the user to press a "yes" or "no" button for acceptance. If accepted (block 444), the user will be instructed to input names by keyboard screen 418 and the remaining process will be analogous to the situation where a one-day tour is selected. If the "no" button is pressed, an agent will intercede.

Figure 8A:
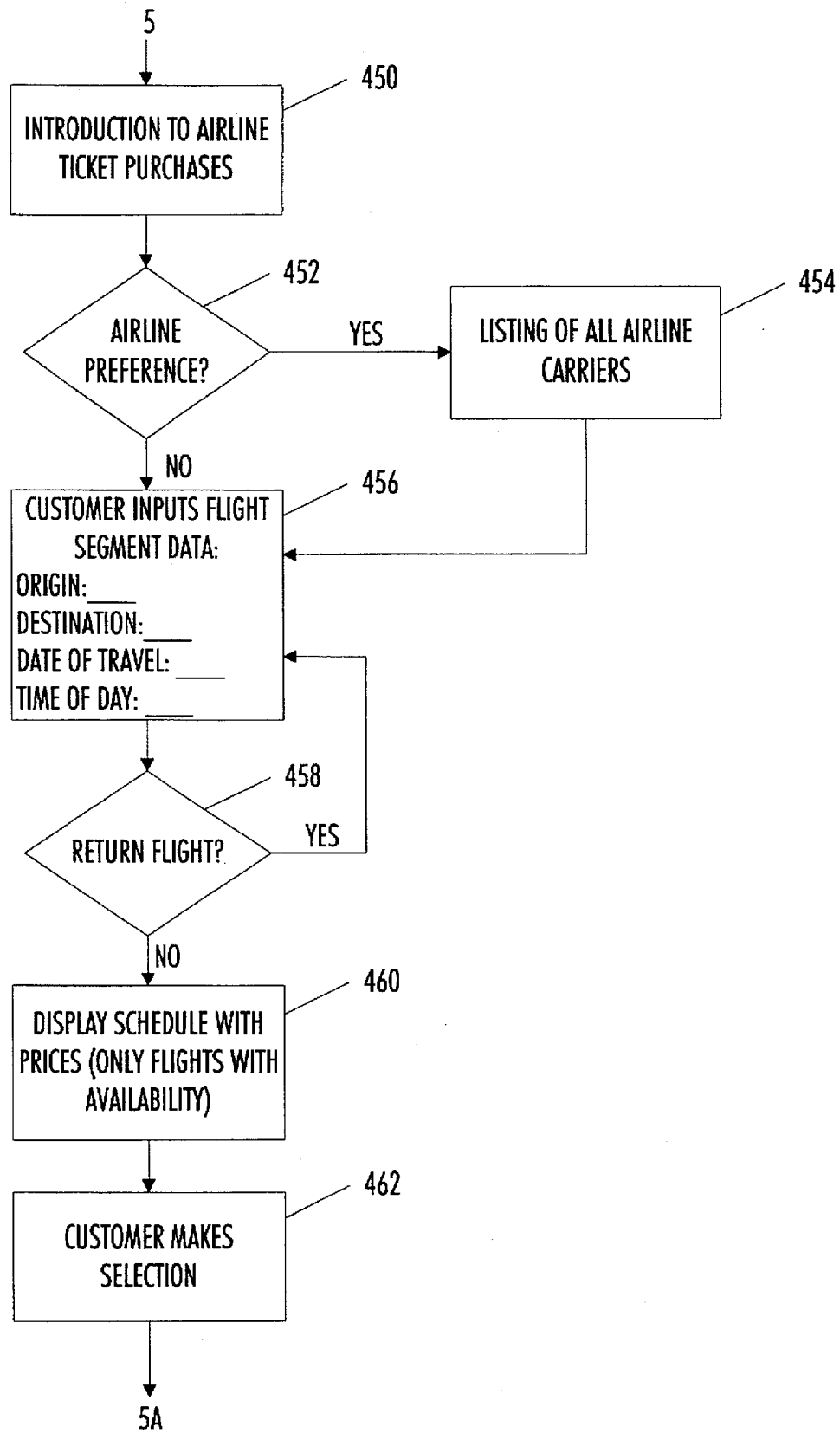
FIGS. 8A and 8B are flow charts illustrating a process for presenting information, querying the user for a preference, assisting the user to select, closing a sale, accepting payment, and delivering the value voucher to the user for airline tickets option of FIG. 3 to illustrate the preferred embodiment of the invention.
Figure 8B:
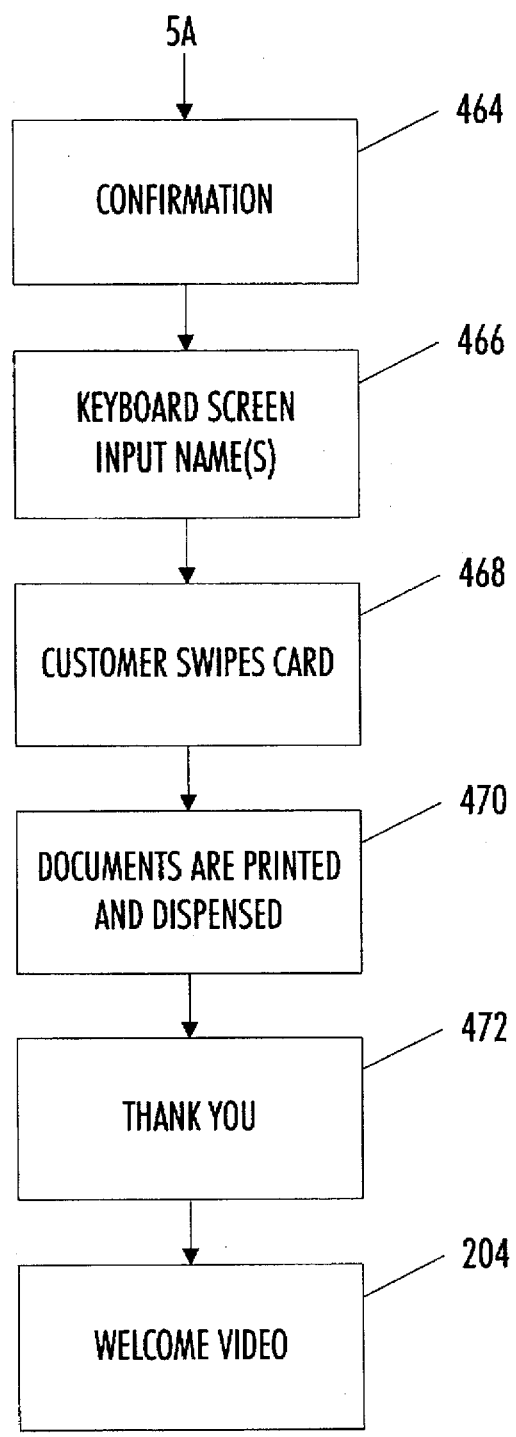

In FIG. 3, if the user selects to purchase airline tickets option 218, the system would activate the routine in FIGS. 8A, 8B. Following the introductory audio visual presentation (block 450), the user will be asked if he or she has an airline preference (diamond 452). If the answer is "yes," an airline menu will appear (block 454) and the user is asked to select an airline carrier. If the user has no preference or after the user has selected an airline carrier, the user is asked to input flight segment data, including preferably the origin, destination, date of travel, and the time of day of travel for departure (block 456). The time of day may be morning, mid-day, late afternoon, or evening. After receiving input by the user or customer, the user is asked as to whether a return flight is desired (diamond 458). If the answer is "yes," the user will be queried to input flight information for the return flight in a manner similar to that for the departure flight (block 456). If no return flight is desired or after the return flight information has been inputted, a flight schedule with prices will be displayed, showing only flights that are available. For this purpose, CPU 78 will cause a search to be initiated in the airline inventory 122 in FIG. 2C. Similar to the case of local lodgings, car rentals, and local attraction bookings, availability information can be checked in real time with airline reservation system 106 or through a CRS vendor 136. The customer is then requested to make a selection (block 462).

If the user has selected a preferred airline, only flights on the preferred carrier will be searched. If no seats are available on the preferred carrier the system will offer alternatives using other airlines. Preferably only one class of service is offered. If the user indicates the lack of an airline preference, a carrier will be recommended based on a predetermined priority system. This system may be based on the lowest fare. After the user has made a selection, a confirmation screen will be displayed showing the itinerary and the amount due. Customers who make their reservations directly with an airline electronic ticketing system or through the CRS vendors and make payment, receive a confirmation number in return. When the traveler goes to the airport, he or she submits the confirmation number and presents some form of identification. The customer is then issued a boarding pass. The major advantage of the electronic ticketing or ticketless travel system is that it eliminates the problem of delivering tickets to customers. The ticketless travel system has obvious advantages for the airlines but it is difficult to find many advantages for the traveler. The value voucher system is a compromise and would work very well with the ticketless travel system.

For this purpose the routine of FIGS. 8A, 8B needs to be slightly modified to accomplish this function. It is assumed that the user has made a reservation through an airline electronic ticketing system (ticketless travel) and may even have paid for ticket(s), and that the user now wishes to obtain a value voucher serving as the ticket from a kiosk such as kiosk 20. Instead of blocks/diamonds 450–462, the traveler would be requested to input his or her confirmation number on the touch-sensitive screen 24. The system then fetches the reservation from systems 106 or 136 of FIG. 2C and displays the traveler's reservation. Any last minute changes can be made at this time. If no changes are required, the user presses the "yes" button and the kiosk 20 accepts payment if payment has not been made and issues the value voucher(s). The advantage of issuing value vouchers is that like airline tickets, customers will have something to hold in their hands. All pertinent flight information will be on the voucher, not merely a confirmation number. It provides a paper trail that will be useful in processing changes, refunds or settling disputes. Like automated teller machines (ATMs), the kiosks will be located in convenient locations to solve the ticket delivery problem.

Returning to block 464 in FIG. 8B, if the user accepts the confirmation, (unless the flight has already been reserved and paid for before the user uses the kiosk as in the example above), he or she is asked to input a name or names for the flights and swipe a credit card. A value voucher is then printed and dispensed, and a "thank you" screen displayed. See blocks 464–472. The system then returns to the welcome video 204 in FIG. 3. After making the selection in block 462, if no flights are available the system will automatically connect the user to a travel agent. Preferably, only one segment flight are sold through the system.

Figure 9A:
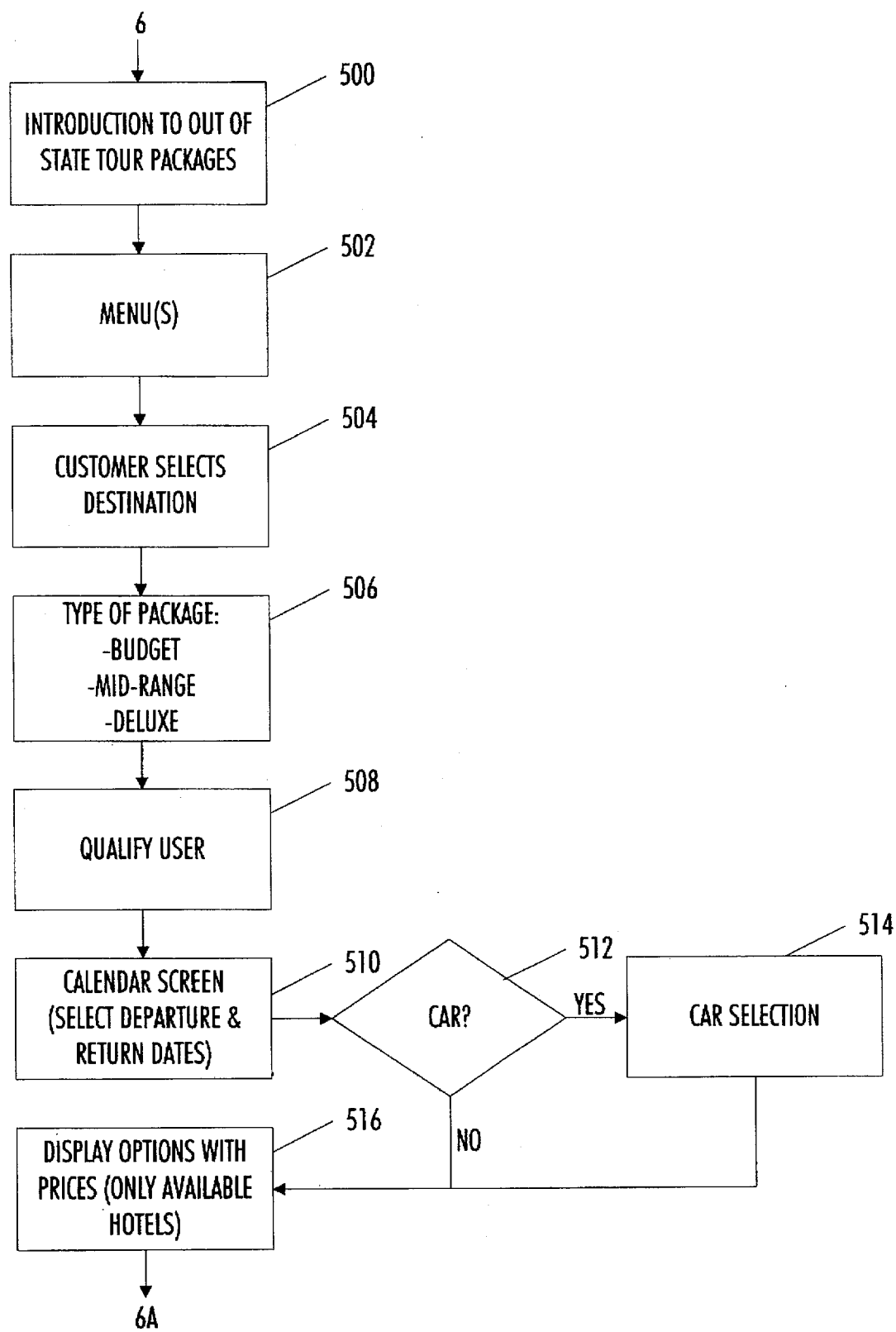
FIGS. 9A and 9B are flow charts illustrating a process for presenting information, qualifying the user, assisting the user to select, closing a sale, accepting payment, and presenting a value voucher to the user for out-of-state tour packages option of FIG. 3 to illustrate the preferred embodiment of the invention.
Figure 9B:
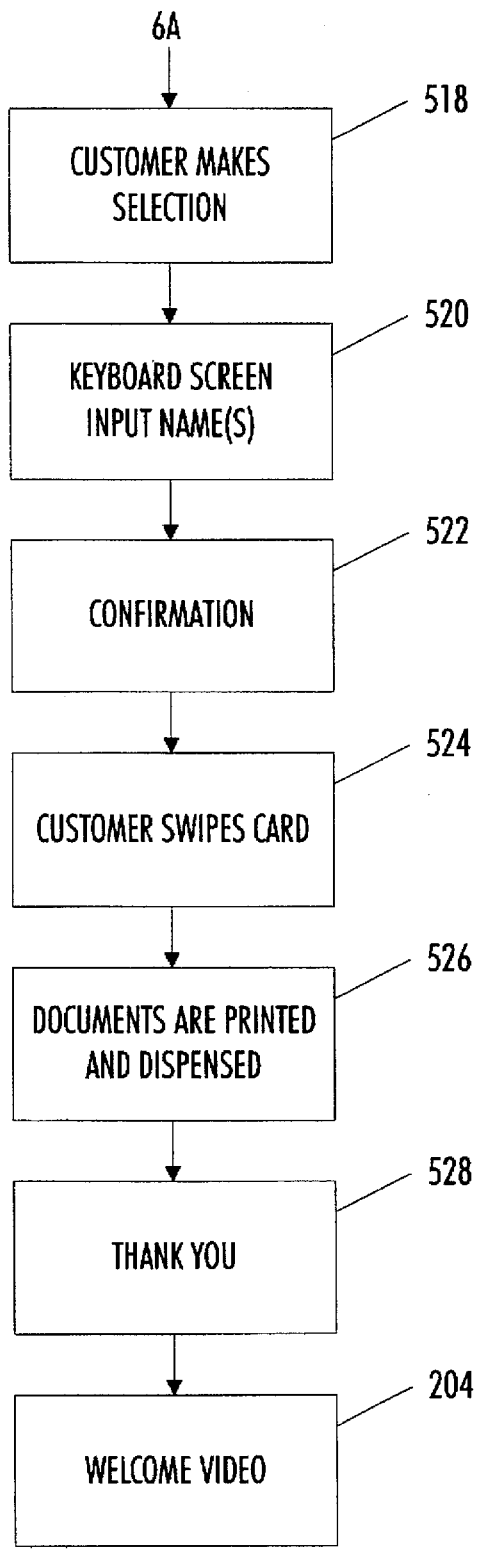

In reference to FIG. 3, if the user selects an out-of-state tour package option 220, CPU 78 would activate the routine in FIGS. 9A, 9B. Following the audio visual introduction to out-of-state tour packages (block 500), a series of menus will appear for the user to select a destination area (blocks 502, 504). The first menu will be very broad to include foreign destinations. Subsequent menus will be more detailed to narrow the search. If the user is interested in an exotic destination or a special interest tour, the user can touch the HELP button for a travel agent. In the preferred embodiment, the kiosk is designed to process high volume, simple tour packages to destinations such as Las Vegas, California, Hawaii and Florida. If the user is interested in packages with complicated itineraries such as a fourteen-day European vacation, the user is requested to press the HELP button in order to talk to a travel agent.

After the user selects a destination, the destination area selected may be further refined. For example, if the desired destination is Las Vegas, the system will query the user to make a decision on three possible destination areas: along the Las Vegas Strip, downtown Las Vegas, or properties off the Strip. The user may also be asked to select a budget, mid-range or deluxe package (block 506). This will be followed by a qualifying phase (block 508) where the user will be queried as to travel knowledge and attribute (individual and/or group) in a manner described above to reduce the search of the database and to simplify the decision process for the user. A calendar screen such as that of FIG. 13. will then be presented to allow the user to input departure and return dates (block 510) and the user will be asked if car rental is desired (diamond 512). If the answer if "yes," the user will make a selection following a process similar to the process described above in reference to FIGS. 6A, 6B in reference to block 514. If car rental is not desired or after a car has been selected, the system will cause tour packages with different options and prices to be displayed (block 516).

During the qualifying step in block 508, if input data from the user indicates that the user is a repeat or return visitor or is otherwise familiar with the hotels at the destination area, all available hotels at the desired price category would be listed with prices. If the user is a first-time visitor and is not familiar with the destination area, a recommended choice of one or two available hotels would be presented to the user (block 516). In the Las Vegas example, usually (i.e. unless the user is in driving distance to Las Vegas) the tour package will include airfare, hotel and airport transfers or car rental, and the user will be queried regarding airline preference and time of day for the departure and return in a manner described above in reference to FIG. 7B. If any one of the three components, namely flight, hotel or car, of the package is not available for the requested dates and destination, the system will automatically connect the user to a travel agent for assistance. Together with the options with prices displayed, the customer will be requested to make a selection. After the customer makes the selection, a keyboard screen will appear requesting the user to input a name or names for the reservation. Then a confirmation screen will appear displaying the tour package selected with prices, and the customer is requested to swipe a credit card. If for some reason the user does not want to confirm the reservation he can press the HELP button and an agent will intercede. See blocks 518–524. A value voucher is then printed and dispensed and a "thank you" screen appears (blocks 526, 528). The system then returns to the welcome video 204 in FIG. 3.

Figure 10:
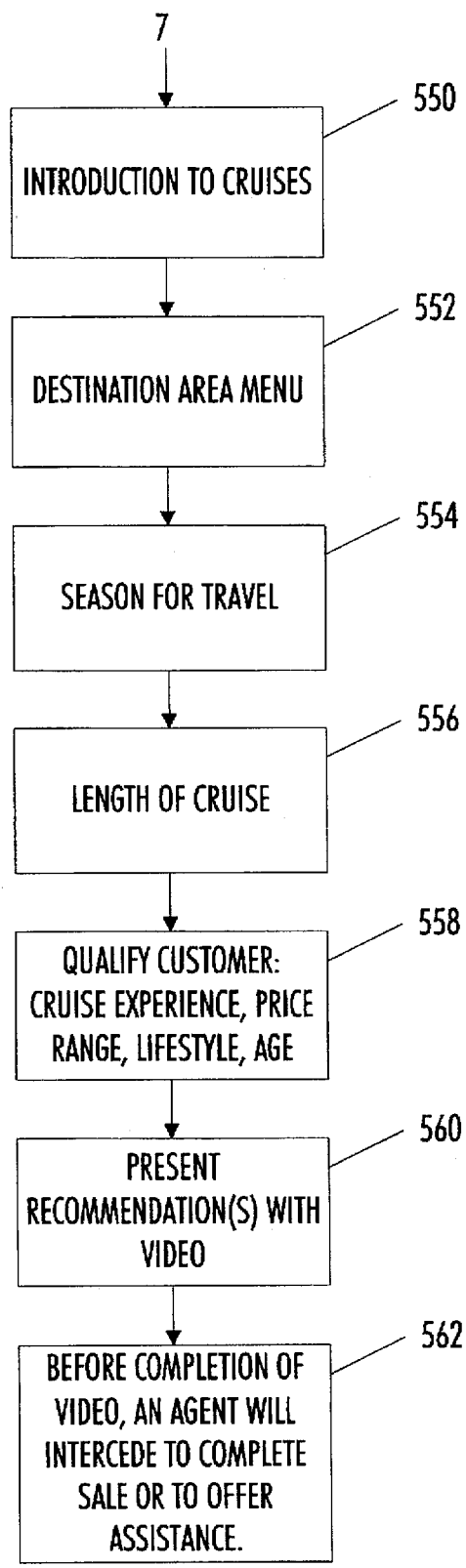
FIG. 10 is a flow chart illustrating a process for presenting information, qualifying the user, assisting the user to select, and connecting the user to a travel agent for the cruise option of FIG. 3 to illustrate the preferred embodiment of the invention.

In FIG. 3, if the user chooses the cruise option 222, the system will activate the process in FIG. 10. Following an audio visual introduction to cruises (block 550), a destination area menu would appear, listing popular cruise destinations, such as Alaska, Asia, Canada/New England, Caribbean, East Coast, Europe, Hawaii, Mexico, North American Waterways, Panama Canal, South America, South Pacific, and Specialty Cruises. The user is requested to make a selection of destination (block 552). If the user selects a Specialty Cruise, the system will connect the user to a travel agent for assistance. After the user has made the selection of destination, the user is asked to select a travel season (block 554), such as one of four seasons: January–March, April–June, July–September, and October–December. After the user has selected a travel season, the user is asked to select the length of cruise desired (block 556), such as to choose from the choices: less than three days, three-four days, seven days, seven-fourteen days, and over fourteen days. The customer is then qualified as to cruise experience or knowledge, price range, lifestyle, age, and other individual or group attributes.

As for price range, the standard measure of cost per day or per diem is used, such as budget (under $200), mid-range ($200–400), deluxe ($400–600), or luxury (over $600). Since cruise lines target specific markets, the user will be asked about lifestyle. The choices may be: fun/action seekers, family, average, and quiet lifestyle. The choices for age may be: under 35, 35–60, and over 60. Given the input data from the user in response to these qualifying questions, the system would search the database residing in the kiosk hard drive 74 or CD-ROM 72 in FIG. 2B. The database will be frequently updated to include the latest marketing specials. If the user has selected a short cruise of less than four days, CPU 78 will cause the recommendation of one cruise to be presented. If the user selected longer cruises, preferably two choices are presented for selection by the user and an audio visual presentation on the choice or choices will be presented as well (block 560). Due to the more complicated nature of cruise bookings, instead of completing the sale by self-service, the system will preferably automatically connect the user to a travel agent to complete the sale or to offer further assistance (block 562).

Figure 11:
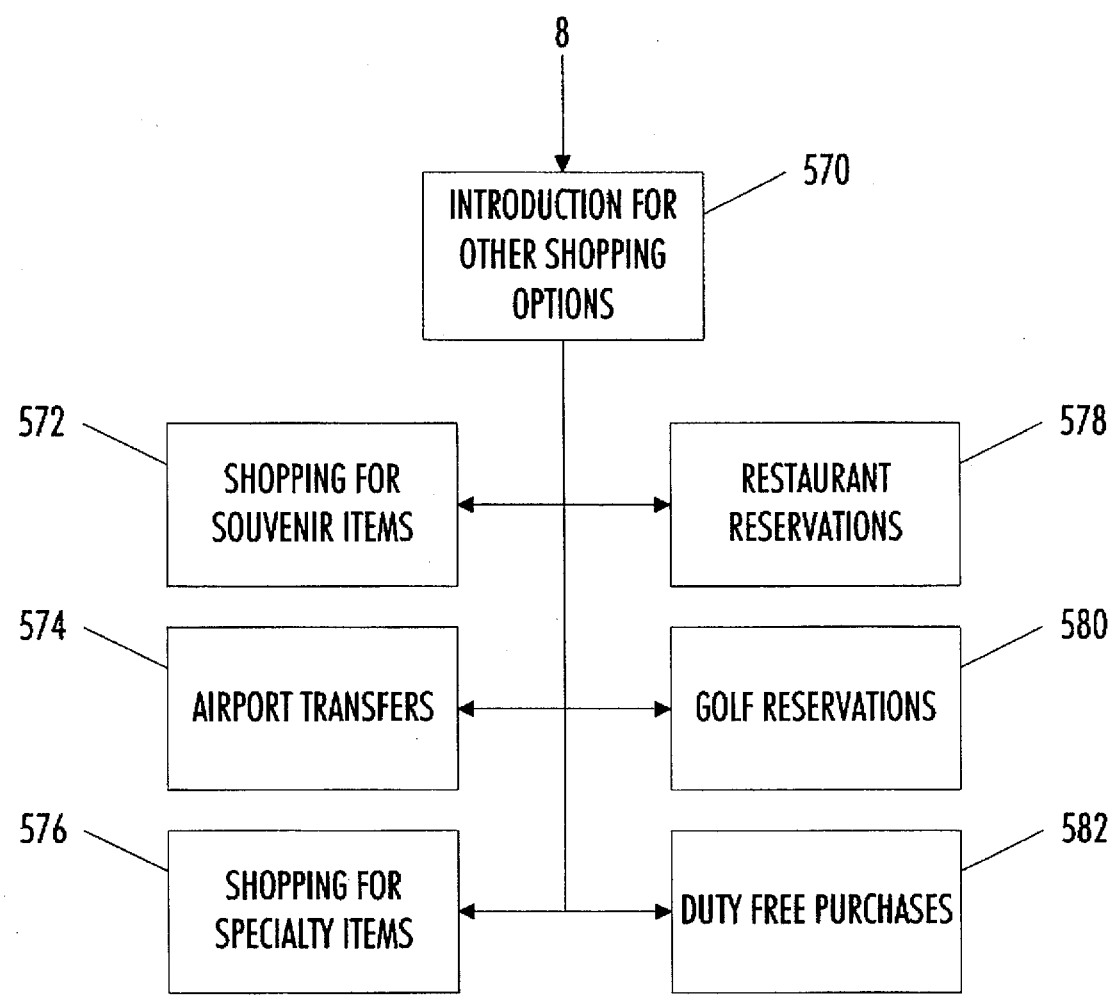
FIG. 11 is a flow chart illustrating a process for offering other shopping options of FIG. 3 to illustrate the preferred embodiment of the invention.

If the user in reference to FIG. 3 presses the other shopping options 224, the system will activate the routine in FIG. 11. An audio visual introduction for other shopping options will first be presented (block 570) and the user will be able to choose from a variety of shopping options from a menu. The following are some possible shopping options: shopping for souvenir items, purchasing airport transfers, shopping for specialty items, restaurant reservations, golf reservations (tee times), and purchasing duty free merchandise. See blocks 572–582. Once the user presses the corresponding button on the touch screen 24, the user will be connected directly to the vendor. This can be done through a communication link 52, 56, 62 between the kiosk and the regional reservation center which communicates with the vendor 141 of FIG. 2C by means of hardware 102. Through such communication links, the vendor can present merchandise, service or products in high resolution still pictures or motion video. Sales and payments can be executed through the kiosk.

First, the system displays information on shopping options for said services and/or products and communicates selection(s) made by the user to the vendor 141 of the services and/or products selected. The user is then queried to input data concerning delivery options for said services and/or products. The system closes a sale of the services and/or products and confirms the sale on a display screen. Payment is accepted in a manner described above for said services and/or products and a written instrument is delivered to the user concerning the paid services and/or products. Lastly, the system informs the vendor of the sale so that the services and/or products are delivered according to said input data. The shopping vendors in the region of the regional reservation center may include Duty Free Shoppers and golf courses.

While it is possible for customers to make air travel reservations through an electronic medium such as the Internet, the present state of the art is such that it is difficult for any such system to guarantee the security of credit card transactions for the flight or flights selected and a practical delivery system for air travel tickets to the user. Thus another aspect of the invention is based on the observation that after a user has made a reservation through the medium such as the Internet, the user can then go to a kiosk to pay for the flight or flights, and obtain a value voucher for the flight or flights. For this purpose, the system 20 is connected to an electronic communication reservation center at which users can make flight reservations. System 20 therefore performs the following steps in order to complete the sale and deliver a value voucher. First, two-way communication is initiated between the user and the system. Then the user inputs a confirmation number to retrieve the reservation from the electronic communication reservation center database. A display screen showing the reservation with schedule flight and price information will be shown and the user is asked to confirm the sale by pressing a "yes" button on the screen. If the user has not made payment, the user is asked to swipe a credit card to pay for the flight or flights selected and the value voucher would then be printed and delivered to the user at the kiosk.

The invention herein is based on issuing non Airlines Reporting Corporation (ARC) tickets. Thus the vouchers printed and issued in reference to block 426 in FIG. 7C and block 470 in FIG. 8B preferably are outside of the ARC system. The ARC is a corporation owned by the airline companies to regulate the distribution of air travel documents (airline tickets) and to act as a clearing house for all receipts and disbursements. The ARC regulates travel agencies in the distribution of airline tickets and payments. It is a huge bureaucracy and many of the rules regulating ticketing are very restrictive and cumbersome. In the preferred embodiment, contracts are made directly with airlines to issue value vouchers in lieu of ARC tickets. Carriers in Hawaii such as Aloha and Hawaiian Airlines have been using value vouchers for over ten years. There are many advantages in bypassing the ARC system. The airlines can significantly improve their cash flow situation by not using ARC tickets. There are no rules which require airlines to use ARC tickets exclusively for air travel. The convenience of using ARC tickets is most apparent when more than one carrier is used on a travel itinerary. For example, a traveler may be flying on United Airlines from Honolulu to Los Angeles and changing to Southwest Airlines from Los Angeles to Phoenix. The traveler makes one payment for the entire trip. The ARC receives payment for the entire trip and disburses the appropriate amounts to the two carriers. A major disadvantage is that the ARC is very slow in making disbursements.

Value vouchers will also work very well with the new ticketless or electronic ticketing concept which is being promoted by Southwest Airlines, United Airlines, Continental Airlines, ValuJet Airlines, and others. Kiosks 20 will be installed on-board cruise ships to sell optional tours for ports of call. Information on tours and activities during ports of call will be stored in the kiosk's hard drive 74 and/or CD-ROM 72. The interactive sales procedure will follow the block diagram for local visitor attractions, FIGS. 4, 4A. A two-way wireless communications link will be provided from ship to shore to regional reservation centers to communicate with local visitor attraction suppliers.

While the invention has been described above by reference to various embodiments, it will be understood that changes and modifications may be made without departing from the scope of the invention which is to be limited only by the appended claims.

What is claimed is:

1. A self-service method of selling services or products related to local visitor attractions of a destination area by means of an interactive electronic travel service system functioning like a travel agent, comprising the steps of:

initiating two way communication between a user and the system;

querying the user as to whether the user has travel knowledge of said destination area;

providing to the user who is a first time visitor and who is not familiar with the destination area information concerning attractions usually preferred by first time visitors;

supplying choices of different local visitor attractions for selection to the user who is a repeat visitor and to the user who is a first time visitor after the providing step; and closing a sale and confirming a reservation for the selected local visitor attraction(s) made by the user.

2. The method of claim 1, further comprising displaying a daily planner and calendar on a display screen for the user to input dates for said local visitor attractions.

3. The method of claim 1, further comprising querying the user for input data concerning number of persons in a party, and name(s) for which a reservation for said services or products is to be made and recording name(s) inputted by the user.

4. The method of claim 1, said confirming step including displaying a confirmation on a display screen with dates, itemized cost and total cost of the purchase made by the user.

5. The method of claim 1, further comprising:

accepting payment for the attraction(s) selected by the user; and delivering one or more value voucher(s) for the paid attraction(s) to the user.

6. A self-service method of selling tours outside of a local area by means of an interactive electronic travel service system functioning like a travel agent, comprising the steps of:

initiating two way communication between a user and the system;

asking the user to select a destination;

requesting the user to select a pricing category from a number of pricing categories for tours to a destination selected by the user;

displaying information on tour packages outside of a local area;

displaying a calendar on a display screen for the user to select departure and return dates for said tour;

querying the user for selection of lodging and/or car rental;

closing a sale and confirming a reservation for the tour with the lodging and/or car rental selected by the user;

wherein said querying step queries the user as to whether the user is a first time visitor and whether the user is familiar with the selected destination, and said querying step further comprises:

providing all available lodging at the selected destination when the user indicates that the user is a repeat visitor or is familiar with the selected destination, and providing one or two suggested choices for lodging when the user indicates that the user is a first time visitor or is unfamiliar with the selected destination.

7. A self-service method of selling cruises by means of an interactive electronic travel service system functioning like a travel agent, comprising the steps of:

initiating two way communication between a user and the system;

asking the user to select a cruise destination, a travel season and length of cruise desired;

qualifying the user for input data on cruise travel knowledge, price range, lifestyle and age information; and recommending at least one particular cruise in response to the input data.

8. The method of claim 7, further comprising providing an audiovisual presentation on said recommended cruise(s).

9. The method of claim 7, further comprising initiating two way communication between the user and a travel agent following the presentation to assist the user in making a decision to close a sale.

10. A method of selling optional tours and other travel-related services and products on cruise ships by means of an interactive electronic travel system functioning like a travel agent, comprising the steps of:

initiating two-way communication between a user and the system;

providing to the user data and choice of said services or products, said data including information concerning ports of call for said services or products;

qualifying the user for preferences and/or attributes;

receiving said input data and searching a database for said desired services or products available during said ports of call; and closing a sale for optional tours and other travel-related services and products.

11. The method of claim 10, said confirming step including displaying a confirmation on a display screen with ports of call, itemized cost and total cost of the purchase made by the user.

12. The method of claim 10, further comprising:

accepting payment for optional tours and other travel-related services and products selected by the user;

delivering at least one value voucher for paid optional tours and other travel-related services and products to the user.

13. The method of claim 10, further comprising two-way communicating between the ships and regional reservation centers to link the kiosks located on board the ships to the regional reservation centers and to travel-related service providers on shore.

* * * * *